US008005731B1

(12) United States Patent
Wolfe et al.

(10) Patent No.: US 8,005,731 B1
(45) Date of Patent: Aug. 23, 2011

(54) REAL TIME VEHICLE PURCHASE REQUEST MANAGEMENT METHOD AND SYSTEM

(75) Inventors: Don P. Wolfe, Irvine, CA (US); Douglas S. Nottage, Irvine, CA (US); Kevin J. Wagoner, Rialto, CA (US); Tim E. Nelson, Pomona, CA (US)

(73) Assignee: Autobytel.com, Inc., Irvine, CA (US)

( * ) Notice: Subject to any disclaimer, the term of this patent is extended or adjusted under 35 U.S.C. 154(b) by 0 days.

(21) Appl. No.: 09/231,415

(22) Filed: Jan. 14, 1999

(51) Int. Cl.
*G06Q 40/00* (2006.01)

(52) U.S. Cl. .......................................... 705/35

(58) Field of Classification Search ............... 705/36, 705/37, 26–28, 1, 1.1, 14, 14.1, 35, 26.62; 709/217; 707/100, 609
See application file for complete search history.

(56) References Cited

U.S. PATENT DOCUMENTS

| 4,972,318 | A | | 11/1990 | Brown et al. | |
|---|---|---|---|---|---|
| 4,992,940 | A | | 2/1991 | Dworkin | |
| 5,283,731 | A | | 2/1994 | Lalonde et al. | |
| 5,311,344 | A | | 5/1994 | Bohn et al. | |
| 5,361,199 | A | * | 11/1994 | Shoquist et al. | 705/26 |
| 5,493,490 | A | * | 2/1996 | Johnson | 705/26 |
| 5,592,375 | A | | 1/1997 | Salmon et al. | |
| 5,671,279 | A | | 9/1997 | Elgamal | |
| 5,694,551 | A | * | 12/1997 | Doyle et al. | 705/26 |
| 5,710,887 | A | | 1/1998 | Chelliah et al. | |
| 5,717,989 | A | | 2/1998 | Tozzoli et al. | |
| 5,774,883 | A | | 6/1998 | Andersen et al. | |
| 5,794,207 | A | * | 8/1998 | Walker et al. | 705/1 |
| 5,838,458 | A | | 11/1998 | Tsai | |
| 5,842,178 | A | | 11/1998 | Giovannoli | |
| 5,903,652 | A | | 5/1999 | Mital | |
| 5,917,965 | A | | 6/1999 | Cahill et al. | |
| 5,937,391 | A | * | 8/1999 | Ikeda et al. | 705/14 |
| 5,940,807 | A | * | 8/1999 | Purcell | 705/26 |
| 6,006,201 | A | * | 12/1999 | Berent et al. | 705/27 |
| 6,009,413 | A | | 12/1999 | Webber et al. | |

(Continued)

FOREIGN PATENT DOCUMENTS

JP 11232326 8/1999

(Continued)

OTHER PUBLICATIONS

Automotive News, "Computerized Selling: Dealership systems now track customers along with the bills and payroll", V0, n0, May 13, 1991, pp. 1-3.*

(Continued)

*Primary Examiner* — Ella Colbert
(74) *Attorney, Agent, or Firm* — Knobbe Martens Olson & Bear, LLP

(57) ABSTRACT

A method and system for managing a purchase request in a Data Center system. The Data Center system receives a purchase request from a plurality of potential buyers. The Data Center system provides access to a plurality of remotely located vehicle dealer or dealer groups. The dealer accesses the purchase request and displays its details. The dealer may then assign the handling of the purchase request to a salesperson. The salesperson ascertains a purchase request property such as an immediate buyer, based upon the purchase request property. The Data Center system further contains one or more action response modules which assist the user to act in response to the ascertained purchase request property. Thus, the Data Center system assists the dealership to efficiently act upon a purchase request.

18 Claims, 29 Drawing Sheets

U.S. PATENT DOCUMENTS

| | | | |
|---|---|---|---|
| 6,032,129 A | 2/2000 | Greef et al. | |
| 6,041,310 A * | 3/2000 | Green et al. | 705/27 |
| 6,073,124 A * | 6/2000 | Krishnan et al. | 705/59 |
| 6,083,267 A | 7/2000 | Motomiya et al. | |
| 6,085,169 A | 7/2000 | Walker et al. | |
| 6,125,391 A * | 9/2000 | Meltzer et al. | 709/223 |
| 6,131,087 A * | 10/2000 | Luke et al. | 705/80 |
| 6,134,533 A * | 10/2000 | Shell | 705/26 |
| 6,173,210 B1 | 1/2001 | Bjornson et al. | |
| 6,226,675 B1 | 5/2001 | Meltzer et al. | |
| 6,233,609 B1 | 5/2001 | Mittal | |
| 6,249,291 B1 | 6/2001 | Popp et al. | |
| 6,282,517 B1 * | 8/2001 | Wolfe et al. | 705/26 |
| 6,324,522 B2 * | 11/2001 | Peterson et al. | 705/28 |
| 6,330,550 B1 | 12/2001 | Brisebois et al. | |
| 6,332,129 B1 | 12/2001 | Walker et al. | |
| 6,334,110 B1 | 12/2001 | Walter et al. | |
| 6,336,105 B1 | 1/2002 | Conklin et al. | |
| 6,922,674 B1 * | 7/2005 | Nelson | 705/26.62 |
| 7,236,983 B1 * | 6/2007 | Nabors et al. | 707/104.1 |
| 2004/0068442 A1 * | 4/2004 | Ertle | 705/26 |

FOREIGN PATENT DOCUMENTS

| | | | |
|---|---|---|---|
| WO | WO 98/21679 | * | 5/1998 |
| WO | WO 00/42541 | * | 7/2000 |

OTHER PUBLICATIONS

Business Wire, "America Online, Inc. Acquires PersonLogic, Inc.", Nov. 11, 1998, pp. 1-2.*
Zikakis, Christopher, Auto Age, "Dealership management information systems: doing it right. (using computerized automobile data)", V26, n8, Apr. 1992, pp. 1-5.*
"Internet auto0sales service can return to Texas"; Fort Worth Star-Telegram (TX); Aug. 20, 1996; p. 1.*
Specification to Application 09188863; Nabors et al.; Nov. 9, 1998; pp. 1-17.*
PR Newswire; Yahoo! Autos Provides Enhanced Road Map for Researching, Buying and Selling Cars Online; Oct. 13, 1998; pp. 1-4.*
Business Editors & High-Tech/Automotive Writers, Business Wire, New York; "Online Car Purchase Through Autoweb.com Beats Offline Hassle; Faster, Better, Easier Car Buying With Autoweb.com"; Aug. 20, 1998; p. 1.*
Business Editors/Automotive & High Tech Writers, Business Wire, New York; "AutoConnect Partners With Industry Leaders to Bring Most-Comprehensive Auto Shopping Site to Web"; May 19, 1998; p. 1.*
PR Newswire, New York; "Stoneage Corporation Announces Database of 250,000 Used Cars Posted to the Internet"; Feb. 24, 1998: p. 1.*
Brian S. akre; "Car-buying services find you deals online; [Final Edition]"; Associated Press: Detroit News; Nov. 5, 1998; pp. 1-2.*
Julie Nash; "Not your father's way to shop for an oldsmobile more peope are finding their wheels on the Web (includes box: Shopping sites)"; Daily Record Staff; York Daily Record; Nov. 2, 1998; pp. 1-3.*
Cassandra Cavanah; "Effective use of PR makes Autobytel.com a household name"; Public Relations Tactics; Nov. 1998; vol. 5, Issue 11; pp. 1 and 2.*
Kim Kmando; "Web Shifting how we buy cars"; Austin American Statesman; Oct. 31, 1998; pp. 1 and 2.*
PR Newswire; "Washingtonpost.com and cars.com Launch Comprehensive Automotive Web Site for the Washington Area"; Oct. 22, 1998; pp. 1 and 2.*
Gregory L. White; "General Motors to Take Nationwide Test Drive on Web—Auto Maker to Expand Its Internet Site to Offer Prices, Inventory Information"; The Wall Street Journal; Sep. 28, 1998; pp. 1-3.*
Eric Tyson; "How your computer can get you the right car at the best price"; Money, V25, n5; May 1996; pp. 1-2.*
1998 Auto-By-Tel Accredited Dealer Training Manual, Jan. 1998.

Auto-By-Tel Accredited Dealers Receive 1,000,000[th] Purchase Request, Oct. 1997.
Paper entitled "Plaintiff Autobytel Inc.'s Disclosure of Asserted Claims and Preliminary Infringement Contentions" related to *Autobytel Inc.* v. *Dealix Corporation*, Civil Action No. 2:04-cv-338-LED, dated Mar. 25, 2005.
Paper entitled "Disclosure of Preliminary Invalidity Contentions by Defendant Dealix Corporation" related to *Autobytel Inc.* v. *Dealix Corporation*, Civil Action No. 2:04-cv-338-LED, dated Apr. 22, 2005.
Paper entitled "Plaintiff Autobytel's Proposed Terms and Claim Elements for Construction Pursuant to P.R. 4-" related to *Autobytel Inc.* v. *Dealix Corporation*, Civil Action No. 2:04-cv-338-LED, dated May 4, 2005.
Paper entitled "Defendant Dealix Corporation's Proposed Terms and Claim Elements for Construction Pursuant to P.R. 4-1" related to *Autobytel Inc.* v. *Dealix Corporation*, Civil Action No. 2:04-cv-338-LED, dated May 4, 2005.
Paper entitled "[Corrrected] Disclosure of Preliminary Invalidity Contentions by Defendant Dealix Corporation" related to *Autobytel Inc.* v. *Dealix Corporation*, Civil Action No. 2:04-cv-338-LED, dated May 9, 2005.
Paper entitled "Joint Claim Construction and Pre-Hearing Statement" related to *Autobytel Inc.* v. *Dealix Corporation*, Civil Action No. 2:04-cv-338-LED, dated Jul. 29, 2005.
Paper entitled "Letter to Peggy Anderson enclosing Autobytel's Tutorial Overview" related to *Autobytel Inc.* v. *Dealix Corporation*, Civil Action No. 2:04-cv-338-LED, dated Aug. 22, 2005.
Paper entitled "Autobytel's Claim Construction Brief Pursuant to Patent Rule 4-5(a)" related to *Autobytel Inc.* v. *Dealix Corporation*, Civil Action No. 2:04-cv-338-LED, dated Aug. 30, 2005.
Paper entitled "Claim Construction Brief of Defendant Dealix Corporation" related to *Autobytel Inc.* v. *Dealix Corporation*, Civil Action No. 2:04-cv-338-LED, dated Sep. 13, 2005.
Paper entitled "Autobytel's Claim Construction Reply Brief Pursuant to Patent Rule 4-5(a)" related to *Autobytel Inc.* v. *Dealix Corporation*, Civil Action No. 2:04-cv-338-LED, dated Sep. 20, 2005.
Paper entitled "Memorandum Opinion and Order" related to *Autobytel Inc.* v. *Dealix Corporation*, Civil Action No. 2:04-cv-338-LED, dated Jan. 18, 2006.
Paper entitled "Defendant Dealix Corporation's Disclosure of First Amended Invalidity Contentions" related to *Autobytel Inc.* v. *Dealix Corporation*, Civil Action No. 2:04-cv-338-LED, dated Mar. 9, 2006.
Paper entitled "Transcript of Markman Hearing Before the Honorable Leonard Davis" related to *Autobytel Inc.* v. *Dealix Corporation*, Civil Action No. 2:04-cv-338-LED, dated Oct. 11, 2005.
Paper entitled "Dealix's Response to Autobytel's First Set of Requests for Admission" related to *Autobytel Inc.* v. *Dealix Corporation*, Civil Action No. 2:04-cv-338-LED, dated Apr. 13, 2006.
Paper entitled "Autobytel's First Set of Requests for Admission to Dealix Corporation" related to *Autobytel Inc.* v. *Dealix Corporation*, Civil Action No. 2:04-cv-338-LED, dated Mar. 15, 2006.
Paper entitled "Complaint for Patent Infringement" related to *Autobytel Inc.* v. *Dealix Corporation*, Civil Action No. 2:04-cv-338-LED, dated Sep. 24, 2004.
Paper entitled "First Amended Complaint for Patent Infringement" related to *Autobytel Inc.* v. *Dealix Corporation*, Civil Action No. 2:04-cv-338-LED, dated Mar. 12, 2002.
Paper entitled "Defendant Dealix Corporation's Answer, Affirmative Defenses, and Counterclaims to Autobytel, Inc's Complaint" related to *Autobytel Inc.* v. *Dealix Corporation*, Civil Action No. 2:04-cv-338-LED, dated Jan. 28, 2005.
Paper entitled "Defendant Dealix Corporation's Answer, Affirmative Defenses, and Counterclaims to Autobytel, Inc's First Amendment Complaint" related to *Autobytel Inc.* v. *Dealix Corporation*, Civil Action No. 2:04-cv-338-LED, dated Feb. 1, 2005.
Paper entitled "Autobytel's Motion to Strike the Korth Declaration" related to *Autobytel Inc.* v. *Dealix Corporation*, Civil Action No. 2:04-cv-338-LED, dated Sep. 10, 2005.
Paper entitled "Order" related to *Autobytel Inc.* v. *Dealix Corporation*, Civil Action No. 2:04-cv-338-LED, dated Sep. 22, 2005.

Paper entitled "Dealix's Response to ABT's Motion to Strike the Korth Declaration" related to *Autobytel Inc. v. Dealix Corporation*, Civil Action No. 2:04-cv-338-LED, dated Sep. 27, 2005.
Paper entitled "Markman Hearing" related to *Autobytel Inc. v. Dealix Corporation*, Civil Action No. 2:04-cv-338-LED, dated Oct. 11, 2005.
Paper entitled "Defendant Dealix Corporation's First Set of Interrogatories" related to *Autobytel Inc. v. Dealix Corporation*, Civil Action No. 2:04-cv-338-LED, dated May 16, 2005.
Paper entitled "Plaintiff Autobytel's Response to Defendant Dealix's First Set of Interrogatories" related to *Autobytel Inc. v. Dealix Corporation*, Civil Action No. 2:04-cv-338-LED, dated Jun. 15, 2005.
Paper entitled "Plaintiff Autobytel's Supplemental Responses to Defendant Dealix's Interrogatory Nos. 2,4 and 5-12" related to *Autobytel Inc. v. Dealix Corporation*, Civil Action No. 2:04-cv-338-LED, dated Nov. 30, 2005.
Paper entitled "Plaintiff Autobytel's Second Set of Supplemental Reponses to Defendant Dealix Interrogatory Nos. 2 and 6-12" related to *Autobytel Inc. v. Dealix Corporation*, Civil Action No. 2:04-cv-338-LED, dated Feb. 3, 2006.
Paper entitled "Dealix's Second Set of Interrogatories to Autobytel Nos. 22-24" related to *Autobytel Inc. v. Dealix Corporation*, Civil Action No. 2:04-cv-338-LED, dated Jan. 13, 2006.
Paper entitled "Plaintiff Autobytel's Responses to Defendant Dealix' Second Set of Interrogatories" related to *Autobytel Inc. v. Dealix Corporation*, Civil Action No. 2:04-cv-338-LED, dated Feb. 13, 2006.
Paper entitled "Defendant Dealix Corporation's Third Set of Interrogatories (Nos. 25-39)" related to *Autobytel Inc. v. Dealix Corporation*, Civil Action No. 2:04-cv-338-LED, dated Apr. 13, 2006.
Paper entitled "Autobytel's First Set of Interrogatories to Dealix" related to *Autobytel Inc. v. Dealix Corporation*, Civil Action No. 2:04-cv-338-LED, dated Jun. 3, 2005.
Paper entitled "Autobytel's Second Set of Interrogatories to Dealix Corporation" related to *Autobytel Inc. v. Dealix Corporation*, Civil Action No. 2:04-cv-338-LED, dated Nov. 10, 2005.
Paper entitled "Autobytel's Amended Second Set of Interrogatories to Dealix Corporation" related to *Autobytel Inc. v. Dealix Corporation*, Civil Action No. 2:04-cv-338-LED, undated.
Paper entitled "Autobytel's Third Set of Interrogatories to Dealix Corporation" related to *Autobytel Inc. v. Dealix Corporation*, Civil Action No. 2:04-cv-338-LED, dated Jan. 30, 2006.
Paper entitled "Dealix's Response to Autobytel's Third Set of Interrogatories" related to *Autobytel Inc. v. Dealix Corporation*, Civil Action No. 2:04-cv-338-LED, dated Mar. 10, 2006.
Paper entitled "Autobytel's Fourth Set of Interrogatories to Dealix Corporation" related to *Autobytel Inc. v. Dealix Corporation*, Civil Action No. 2:04-cv-338-LED, dated Mar. 15, 2006.
Paper entitled "Dealix's Response to Autobytel's Fourth Set of Interrogatories" related to *Autobytel Inc. v. Dealix Corporation*, Civil Action No. 2:04-cv-338-LED, dated Apr. 13, 2006.
Complaint for Patent Infringement—Jury Trial Demanded—*Autobytel Inc. vs. Insweb Corporation, Leadpoint, Inc., Internet Brands, Inc.*, and Auto Internet Marketing, Inc. Civil Action No. 2:07—cv-524-TJW filed Nov. 30, 2007 in the Eastern District of Texas, Marshall Division.
Henry, Ed, The Virtual Car Buyer, Kiplinger's Personal Finance Magazine, p. 145-150, Sep. 1995.
Conhaim, Wallys W., Buying cars online, Link-Up, V15, N5 Sep. 1, 1998.
Electronic Marketplace Report, Automotive Sites Missing Web Ad Opportunitites, V10, N22, Nov. 19, 1996.
Interactive Marketing News, Auto-by-Tel wins educated customers and low prices, V31, N29, Oct. 18, 1998.
PR Newswire Page, Autoweb.com's New Risk-Free Pricing structure revolutionizes online car buying industry, Feb. 9, 1998.
Nauman, Matt, The virtual showroom car shopping on the web, San Jose Mercury News, Section, Drive, p. 12, Feb. 7, 1997.
PR Newswire, Navidec Inc. Announces "Wheels" launch progress ahead of schedule, Oct. 27, 1997.
Naughton, Keith, Revolution in the showroom: Finally, consumers are in the driver's seat and pushy dealers look like dinosaurs, Business Week, n3463, p. 70, Feb. 19, 1996.
Business Wire, Lycos and AdOne's Classified Warehouse.com create online alliance..,p. 1093, Dec. 2, 1998.
Hickford, Michelle, Autoweb.com: Industry leader Autoweb.com revolutionizes online car . . . , Jan. 31, 1998.
Washington, Frank S., Autoweb plans major effort, Automotive News, v71, n5726, p. 1-6, Aug. 11, 1997.
Akasie, Jay, Want to buy a new car? Forbes, v. 162 n. 13, p. 144-148, Sep. 1995.
Business Wire, "Cadillac Warehouse Announces New Web SiteCadilacWarehouse.com" Jul. 1,1998, pp. 07011134.
PR Newswire, "Mitsubishi Motors Launches Completely Revamped Internet Web Site", Aug. 25, 1997, pp. 1825LAM065.
PR Newswire, "Saturn Announces First Wave of Purchase Through It Interactive Pricing Center on the Internet", Jun. 11, 1997, pp. 0611DEW017.
Automotive News, "Makers soup up Web Sites", Jan. 26, 1998, p. 46.
Automotive News, "58 Subaru Dealers on 1 Site", Jun. 8, 1998 p. 18.
M2Presswire, "What Car? TV Limited: What Car? Online and What Car?", Text boost manufacturer and dealer sales leads, Aug. 31, 1998.
Top Spending Auto Marketers Strive for Advertising Efficiency (US Auto Industry Spent $6.5 Billion in Measured Media in 1997), Advertising Age, Oct. 5, 1998, v69n40,ps16, Dialogue File 9 #02259616.
Cooke, "Just Browsing: Logistics Management and Distributional Report".
Friel, "Window on the Web".
Halper, "Meet the Middlemen".
Janal, "Net Profit Now".
Kilbane, "Java, Internet FTP Technologies Provide New Alternative to Traditional EDI Communications".
Microsoft Press Computer Dictionary ($3^{rd}$ Ed.).
Newsbytes Breaking News Headlines, Newsbytes, Nov. 4, 1997.

* cited by examiner

EXCLUSIVE DEALER REGIONS RECORD

|  | ZIP CODES | | | |
|---|---|---|---|---|
| V E H I C L E    M A K E | | DEALER IDENTIFICATION NUMBER | ... | 202 |
| | | | | |
| | | DEALER IDENTIFICATION NUMBER | | |
| | | ⋮ | | |
| | | | | |

FIG. 2

| VEHICLE MAKE | VEHICLE MODEL | VEHICLE YEAR | VEHICLE TYPE | VEHICLE ESTIMATED PRICE | VEHICLE FEATURES | VEHICLE PHOTO |
|---|---|---|---|---|---|---|
| 402 | 404 | 406 | 408 | 410 | 412 | 414 |

NEW VEHICLE RECORD

FIG. 4

USED VEHICLE RECORD

| DEALER IDENTIFICATION NUMBER | DEALER STOCK NUMBER | VEHICLE MAKE | VEHICLE MODEL | VEHICLE INFORMATION | VEHICLE PHOTO |
|---|---|---|---|---|---|
| 302 | 502 | 504 | 506 | 508 | 510 |

FIG. 5

DEALER RECORD

| DEALER IDENTIFICATION NUMBER | DEALER INFORMATION | ACCESS LIST | PRODUCT LIST | NEW VEHICLE PURCHASE REQUESTS | USED VEHICLE PURCHASE REQUESTS |
|---|---|---|---|---|---|
| 100001 | BOC OF IRVINE 123 ANY STREET IRVINE, CA. 92612 | BUICK GM, OLDS GM, CADILAC GM, SALESPERSON 1 ... SALESPERSON 2 | BUICK CENTRY, BUICK RIVIERA, OLDSMOBILE CUTLASS, CADILAC SEVILLE, ... | NEW VEHICLE PURCHASE REQUEST 1 NEW VEHICLE PURCHASE REQUEST 2 ... NEW VEHICLE PURCHASE REQUEST n | USED VEHICLE PURCHASE REQUEST 1 USED VEHICLE PURCHASE REQUEST 2 ... USED VEHICLE PURCHASE REQUEST n |

| Home | New | Used | Research | Finance | Insur | Warranties | Rewards |

1996 CAR

1 Vehicle located

Select a different make
Select a different model

Scroll down and click for photo & details

1996 Car — 1402     $29,995
Black — Automatic — 6 cyls     43,912
2558 mi from 92612

FIG. 14

| Home | New | Used | Research | Finance | Insur | Warranties | Rewards |

1996 CAR

1 Vehicle located

*Select a different make*
*Select a different model*

*Scroll down and click for photo & details*

1996 Car
Black – Automatic – 6 cyls
2558 mi from 92612          $29,995
                             43,912

— 1402

1996 CAR
*Request vehicle*
*Dealer Inventory Searches*

— 1502

Hookset, New Hampshire – 2558 miles from 92612

Click here for a FREE Lemon Check on this car!

Low CyberStore Price        $29,995
Mileage                      43,912
Exterior/Interior    Black/ Gray leather Automatic Transmission – Power Passenger Seats – Leather Seats – Power Driver Seat – Bucket Seats – Sun Roof – Overhead Console – Cassette Player – AM/FM Radio – Alloy Wheels – Tilt Steering – Anti-Lock Brakes – Cruise Control – Power Locks – Power Windows – Power Steering – Air Conditioning

Plan to buy?
Click the button below to make an appointment to view or purchase this vehicle

[ Request this Vehicle ]

FIG. 15

| Home | New | Used | Research | Finance | Insur | Warranties | Rewards |

The Best Way to Buy a New Car, Online

To fully benefit from Autobytel.com's free service, we ask that you spend a couple of minutes tp prepare before submitting your purchase request. Before starting, please:

- Use the <u>research</u> section of this website to narrow your choices.
- Select the <u>make</u> and <u>model</u> you wish to lease or purchase.

Ready to go?

If you've done your reasearch and picked a new Acura to purchase, select a model from this list and click on GO!

Make: Acura
Model: [3.2TL ▼]  [GO]  — 1602

Still considering a range of new makes or models?

Maybe a Acura is not the only vehicle you would like to consider. If this is the case, you can ssearch for a new vehicle by broader criteria:

- <u>Browse</u> our new vehicle photo gallery to explore a variety of vehicle similar to Acura.
- <u>Select</u> a new vehicle based upon features like type, mileage, price, etc...

Appointments for 1 DRT Classic Interface

Tue, January 05, 1999

No Appointments Today!

Previous 7 Days:

| When | Customer | Action |
|---|---|---|
| 12/29/98 07:30 AM | Buddy Rich | Send Email |

This is a test of the emergency appointm

| When | Customer | Action |
|---|---|---|
| 12/29/98 07:00 AM | GEORGE CIMINALE | Send Email |

Is the 'reminder' function working yet

Next 7 Days:

| When | Customer | Action |
|---|---|---|
| 01/10/99 07:30 AM | Joey Doey | Send Email |

FIG. 29

REAL TIME VEHICLE PURCHASE REQUEST MANAGEMENT METHOD AND SYSTEM

RELATED APPLICATIONS

The present application is related to the following commonly owned U.S. Patents or patent applications:
COMPUTER IMPLEMENTED PURCHASING SYSTEM WITH AVAILABLE INVENTORY MANAGEMENT FUNCTIONS, application Ser. No. 09/232,188, which was filed Jan. 14, 1999 and is abandoned.
SYSTEM AND METHOD FOR SELECTIVELY RETRIEVING INFORMATION ITEMS, application Ser. No. 09/231,521, which was filed Jan. 14, 1999 and is abandoned.
COMPUTER IMPLEMENTED PURCHASING SYSTEM WITH AFTERMARKET PRODUCT INVENTORY DISPLAY, application Ser. No. 09/231,898, which was filed Jan. 14, 1999 and issued on Jul. 26, 2005 as U.S. Pat. No. 6,922,674.
REAL TIME COMMUNICATION OF PURCHASE REQUESTS, application Ser. No. 09/231,409, which was filed Jan. 14, 1999 and issued on Aug. 28, 2001 as U.S. Pat. No. 6,282,517.
COMPUTER IMPLEMENTED PURCHASING SYSTEM WITH USER ACCESSIBLE PURCHASE REQUEST STATUS, application Ser. No. 09/231,525, which was filed on Jan. 14, 1999 and is abandoned.

Each of the above referenced patent applications are incorporated by reference herein in their entireties.

BACKGROUND

1. Field

The present invention is related to systems and methods for conducting business transactions using networked computers. Furthermore, this invention relates to communicating a potential customer's purchase request to a seller and a seller managing such purchase requests.

2. Description of the Related Art

The global economy has made the business of selling more competitive than ever. Businesses that do not maximize customer satisfaction and profitability may not survive in today's markets. Businesses are therefore demanding tools and methods to provide a competitive edge.

In a conventional vehicle sales scenario, a potential automobile purchaser initiates a purchasing process by visiting a dealership. The customer may make several preliminary visits before making his or her purchasing intent known to the dealer. Until the purchasing intent is revealed, the dealer acts inefficiently in attempting to consummate a customer purchase.

For example, the dealer maintains potentially unnecessary resources to handle the preliminary visits. Not knowing whether the potential customer intends to make a purchase, a large number of salespersons stand ready to confront all visitors to the dealership. However, many visits are preliminary and do not require the assistance of a salesperson. Accordingly, inefficiency is often experienced in such a conventional vehicle dealership setting.

Moreover, in the conventional vehicle dealership setting, namely, a car dealer, the salesperson works on a commission basis. The salesperson's income is directly related to a vehicle's sales price and the number of vehicle sales. Thus, the salesperson will want to be credited for the sale and earn the resulting commission. The conventional vehicle dealership setting may not foster efficient cooperation between the sales staff. Thus, the purchaser may experience frustration and unpleasantness with the purchasing experience.

For example, once a customer is approached by a salesperson, any resulting sale is credited to the salesperson. As far as the purchasing process, the salesperson may be the purchaser's sole dealership contact. The other sales staff may be reluctant to assist either the salesperson or the purchaser in consummating the sale. This inefficiency may ultimately result in customer frustration and a lost sale for the dealership. In this setting, the dealership operates inefficiently in processing the purchase request.

Multi-franchise dealerships are becoming common in today's vehicle marketplace. A multi-franchise dealership sells more than one make of vehicle from a single location and a single sales staff. With the multi-franchise dealer, not all members of the sales staff are equally knowledgeable and qualified to sell all vehicle makes sold by the dealership.

In the multi-franchise dealership, a purchaser looking for one make of vehicle may be approached by a salesperson less qualified to assist the purchaser in making the purchase of the desired vehicle than other salespersons in the same dealership. The salesperson may not possess the required product knowledge, or may be too busy to provide the necessary assistance. But, the lack of cooperation between the sales staff, inhibits the purchaser from receiving better assistance. Thus, customer satisfaction is not maximized, and the purchaser may experience unnecessary frustration. This results in dealership inefficiencies and potential lost sales.

SUMMARY

The present invention is related to systems and methods for conducting transactions utilizing networked computers. More particularly, this invention relates to communicating a potential customer's vehicle purchase request to a seller and a seller managing the purchase request.

In conducting a commercial transaction such as the sale of a vehicle, a Data Center system facilitates the creation and submission of a purchase request. The Data Center system provides at least a first user web page accessible by a potential buyer. The potential buyer accesses this web page and provides the necessary information needed to create a purchase request.

The buyer provided information is then used to create a new vehicle purchase request record or a used vehicle purchase request record. Both purchase request records contain multiple fields. Each field may additionally contain multiple sub-fields or may even point to other fields or records. The purchase request record contains buyer and product information such as buyer contact information, product description, and payment information.

The purchase request record is stored in a Data Center system database. In one embodiment, the Data Center system database may be partitioned into exclusive database regions. Each participating seller may be assigned an exclusive database region. In another embodiment, a seller record may advantageously exist for each seller, and the seller record contains information associated with the particular seller. For example, the seller record can contain or point to the seller's purchase request records. Here, the collection of all records associated with the seller advantageously comprises a virtual exclusive database region in the Data Center system database. The Data Center system database further contains information regarding, for example, sellers, exclusive seller regions, and available products.

When a potential buyer submits either a new vehicle purchase request or a used vehicle purchase request, the Data Center system invokes program modules such as, by way of example, a buyer access module, to create an appropriate purchase request record. Moreover, the Data Center system identifies and notifies an appropriate seller of the purchase request. In one embodiment, the purchase request record is stored in the appropriate seller's exclusive database region. In another embodiment, the seller record may advantageously point to the purchase request record. Thus, the seller immediately becomes aware of the purchase request upon the creation of the purchase request record. In an alternative embodiment, the Data Center system may identify and notify one or a plurality of sellers of the purchase request. Here, the purchase request record may be stored in each identified seller's exclusive database region.

For a new vehicle purchase request, the appropriate seller is advantageously determined by exclusive seller regions based on vehicle make and zip code. For a used vehicle purchase request, the vehicle description generally determines the appropriate seller or sellers.

In one embodiment of the invention, the potential buyer accesses the Data Center system user web pages to submit the purchase request. The Data Center system may assist the buyer in formulating the purchase request. For example, the Data Center system may prompt the buyer to provide the information necessary to create the purchase request.

The Data Center receives the purchase request information from the buyer and determines an appropriate seller to receive the purchase request. The Data Center then proceeds to create and store the appropriate purchase request record in the database; region exclusively assigned to the seller. In one embodiment, the newly created purchase request record may be virtually stored in the seller's exclusive database region by associating or linking the purchase request record to the appropriate seller record.

The present invention facilitates a real time communication of a purchase request to a seller. The real time communication is accomplished by creating the purchase request record in the seller's exclusive database region. As aforementioned, the exclusive database region may either be physically created or virtually created. The real time communication of the purchase request to the seller occurs upon the creation of the purchase request record in its exclusive database region. The seller becomes aware of the newly created purchase request immediately upon the creation of the purchase request record.

In one example, a seller A may be accessing its exclusive database region via a network. Concurrently, a potential buyer may submit a purchase request to the Dalia Center. The Data Center system may determine seller A as the seller to receive the purchase request and accordingly, create a purchase request record in seller A's exclusive database region. This is analogous to the buyer submitting the purchase request by directly writing into the seller=3 s exclusive database region. Immediately upon the purchase request record's creation, seller A becomes aware of the newly created purchase request because the seller has direct access to its exclusive database region. In one embodiment, Seller A's computer screen may be immediately refreshed to reflect the newly created purchase request. In another embodiment, Seller A may be notified via communication mechanisms such as e-mail, page, telephone message, or the like.

Thus, in contrast to conventional systems, the seller is made aware of a new purchase request without significant processing delay. Moreover, the seller may efficiently and advantageously act upon the purchase request in real time.

The present invention also facilitates real time purchase request management by a seller. The Data Center system provides the seller at least a second Hypertext Markup Language (HTML) page with which to directly access its exclusive database region. The direct and immediate access enables the seller to be immediately notified of newly create purchase requests along with any other seller information stored in its exclusive database region. The immediate notification and direct database access enables the seller to efficiently manage its purchase requests.

A seller is able to immediately determine a purchase request priority upon viewing the purchase request record. For example, the seller can display the purchase request record contents and determine the purchase request's priority. The purchase request priority enables the seller to efficiently act upon the purchase request in a timely manner.

Also, for any purchase request, the seller may associate a purchase request task such as, by way of example, making the initial buyer contact, and calling the potential buyer to provide a haggle-free price quote, to a purchase request and assign the task to a user associated with the seller. Thus, the invention advantageously provides for the assignment of separate tasks to individuals most capable of efficiently acting on the purchase request.

The Data Center system initially assigns a status of "new" to each submitted purchase request. The seller may subsequently change the status by assigning a different status such as, by way of example, "quoted", "pending", and "sold", to the purchase request. This enables the seller to efficiently manage its purchase requests by appropriately determining what action to take based on the purchase request status.

Thus, in contrast to conventional systems, the seller is able to efficiently manage its purchase requests by assigning tasks to capable salespersons. Moreover, the seller may efficiently and advantageously act upon the purchase request based upon the current purchase request status. This increases customer satisfaction and the likelihood of consummating a vehicle sale.

BRIEF DESCRIPTION OF THE DRAWINGS

These and other aspects, advantages, and novel features of the invention will become apparent upon reading the following detailed description and upon reference to accompanying drawings in which:

FIG. 2 is a representation of one embodiment of an exclusive dealer regions record of the invention;

FIG. 4 is a representation of one embodiment of a new vehicle record of the invention;

FIG. 5 is a representation of one embodiment of a used vehicle record of the invention;

FIG. 12 is a representation of one embodiment of a dealer record showing the contents of the record fields;

FIG. 13 is a representation of one embodiment of a dealer record showing certain of the fields implemented as pointers;

FIG. 14 is a representation of one embodiment of a web page containing a hypertext link;

FIG. 15 is a representation of another embodiment of a web page containing a hypertext link;

FIG. 16 is a representation of one embodiment of a web page suitable for use in the new vehicle purchase request creation and submission process; and FIG. 17 is a representation of one embodiment of an HTML page illustrating a scrollable list of purchase requests implemented as links;

FIG. 23 is a representation of one embodiment of an HTML page illustrating a dead deal reason pull-down menu;

FIG. 29 is a representation of one embodiment of an HTML page illustrating the appointments and tasks assigned to a user.

DETAILED DESCRIPTION

Figure 1:
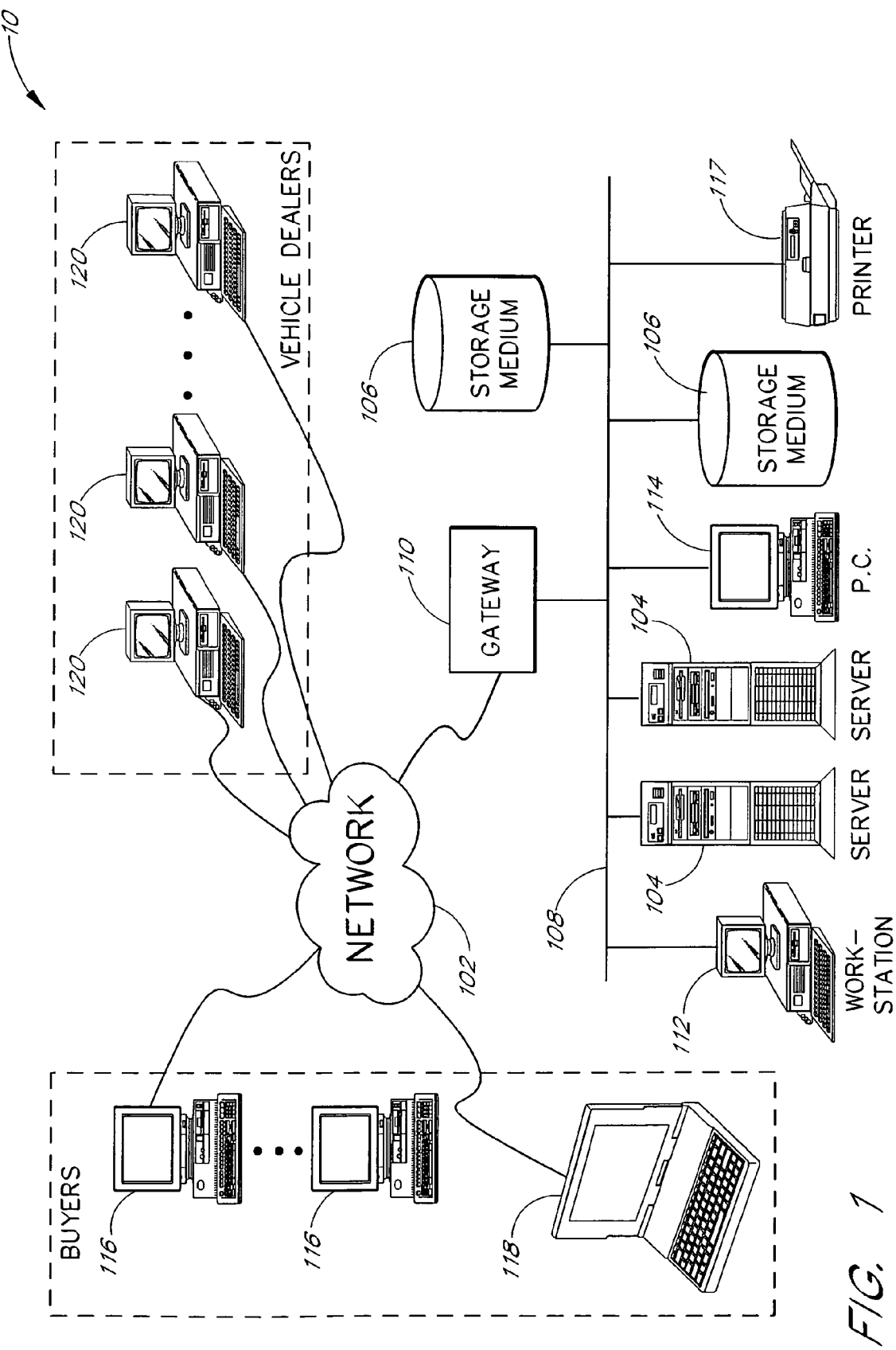
FIG. 1 is a system block diagram illustrating an embodiment of the overall network architecture of the invention.

In one embodiment of the invention, a computerized purchase request communication system is provided which facilitates a real time communication of a purchase request to a system determined seller. The system includes a plurality of HTML pages accessible over a network. A potential buyer accesses a first HTML web page over a network such as the World Wide Web (www) using a standard web browser. A participating seller accesses a second HTML page over a network advantageously utilizing a standard web browser and by providing a URL to identify the system. The system further comprises a web server and other program modules which enable direct and immediate access into a system database. As used herein, "immediately" is understood to mean occurring without loss or interval of time other than the nominal delay necessarily caused by computing components such as microprocessors, memory devices, software and firmware program execution times, and the like.

A participating seller is a seller of goods which has entered into an agreement to participate in the computerized purchase request management system of the invention. The seller is identified by a unique seller record stored in the system database. The seller is further assigned an exclusive database region in the system database. The seller directly accesses its exclusive database region over the network utilizing the system's HTML pages.

The potential buyer uses the system's HTML web pages to formulate and submit a purchase request into the system. The just created purchase request is communicated to an appropriate participating seller upon the system storing a purchase request record into the seller's exclusive database region.

The participating seller is initially assigned a group account in the Data Center system. The seller is given a unique login identification and a password to access the group account. A person associated with the seller logs onto the system utilizing one of the plurality of HTML pages comprising the system and providing the login identification and password. Initially, there are no users set up in the group account. Thus, the person may advantageously establish one or a plurality of users for the group account. Each user created within the seller group is associated with a user profile which filters the information contained in the exclusive database region to be efficiently displayed to the user.

All users in a seller group use the same login identification and password to initially log on to the Data Center system. Having logged on, a user identifies himself or herself to the system by selecting his or her user identification from a displayed list. Details on logging into the system, establishing user profiles, and selecting a user are included in the commonly owned U.S. patent application entitled A SYSTEM AND METHOD FOR SELECTIVELY RETRIEVING INFORMATION ITEMS, application Ser. No. 09/231,521, which was filed on Jan. 14, 1999, is abandoned, and which is incorporated by reference herein in its entirety.

Having successfully logged onto the system, the user is able to access the information stored in its exclusive database region. The plurality of HTML pages comprising the system provide direct and immediate access into the exclusive database region. The direct and immediate access enables the user to be immediately notified of newly created purchase requests along with any other seller information stored in its exclusive database region. The immediate notification and direct database access enables the user to efficiently manage its purchase requests.

A user is able to immediately determine a purchase request priority upon viewing the purchase request record. The priority is specified by the buyer and stored as part of the purchase request record. The purchase request priority enables the user to efficiently act upon the purchase request in a timely manner. For example, the user may advantageously consider the purchase request priority in assigning tasks associated with the purchase request. Also, the user may efficiently allocate resources based upon the purchase request priority by allocating more resources to higher priority purchase requests.

For any purchase request, the user may assign specific tasks such as, by way of example, making the initial buyer contact, and calling the potential buyer to provide a haggle-free price quote, to any of the users in the seller group. These tasks may be stored as part of the purchase request record. A summary of each assigned task is displayed along with the purchase request. Furthermore, an HTML page may advantageously inform a user of its assigned tasks. Thus, the invention advantageously provides for the assignment of separate tasks to individuals most capable of efficiently acting on the purchase request.

The invention initially assigns a status of "new" to each submitted purchase request. Users may change the status by assigning a status such as, by way of example, "could not contact", and "quoted", to the purchase request. For example, the user could change the status based upon factors such as the buyer informing the user of his or her intent not to make a purchase, the user having made a price quote, and the like. The purchase request status may be stored as part of the purchase request record and displayed along with the purchase request. The system creates exclusive sales regions based on geographic zip code and product type. Each participating seller is then assigned one or a plurality of exclusive sales regions depending on the agreement entered into by the seller. As an example, a seller X may be assigned the exclusive sales region encompassing the zip code 12345 for product A. Then, all purchase requests for product A identified as originating in zip code 12345 will be communicated to seller X. In an alternative embodiment, one or a plurality of sellers may be assigned to a single sales region. Thus, a purchase request may be sent to the plurality of sellers.

A potential buyer utilizes the plurality of buyer web pages comprising the system to create a purchase request. The system determines an appropriate seller to receive a purchase request based upon certain information supplied by the buyer. Having determined an appropriate seller, the system immediately stores the purchase request in the appropriate seller's exclusive database region. It is as if the potential buyer directly created the purchase request in the seller's exclusive database region.

The participating seller utilizes the plurality of HTML pages comprising the system to directly access the seller's exclusive database region. The system facilitates direct, concurrent access of the exclusive database region through both the buyer web pages and the seller HTML pages. As an example, the system may store the purchase request into a seller's exclusive database region immediately upon the creation and submission of the purchase request irrespective of whether the seller is concurrently accessing its exclusive database region. If the seller is accessing its exclusive database region, the seller is immediately made aware of the newly created purchase request. If the seller is not currently accessing the system, by immediately storing the just created purchase request in the seller's exclusive database region, and because the seller may directly access its database region, the system communicated the purchase request in real time.

Even though the invention is suitable for communicating a purchase request far any product, the invention will be further disclosed in the context of communicating a purchase request for a vehicle in a vehicle sales environment. Throughout the drawings, components which correspond to components shown in previous figures are indicated using the same reference numbers.

In one embodiment of the invention, a Data Center system facilitates the sales process by informing a vehicle dealer, in real-time, of a potential buyer. The Data Center system utilizes a database to store dealer information, buyer information, and program logic, for example, to associate the potential buyer to a specific dealer. Additionally, the Data Center system may efficiently manage its purchase requests by appropriately determining what action to take based on the purchase request status.

Even though the invention is suitable for managing a purchase request for any product, the invention will be further disclosed in the context of managing a purchase request for a vehicle in a vehicle sales environment. Throughout the drawings, components which correspond to components shown in previous figures are indicated using the same reference numbers.

In one embodiment of the invention, a Data Center system utilizes a database to store dealer information, buyer information, and program logic, for example, to associate the potential buyer to a specific dealer. Additionally, the Data Center system may advantageously include program logic facilitating access between the Data Center system and sources external to the Data Center system over a computer network.

Computer networks suitable for use with the present invention include local area networks (LAN), wide area networks (WAN), Internet, or other connection services and network variations such as the world wide web, the public internet, a private internet, a private computer network, a secure internet, a private network, a public network, a value-added network, and the like. The computers connected to the network may be any microprocessor controlled device that permits access to the network, including terminal devices, such as personal computers, workstations, servers, mini computers, mainframe computers, laptop computers, mobile computers, palm top computers, hand held computers, set top box for a TV, or a combination thereof. The computers may further possess input devices such as a keyboard or a mouse, and output devices such as a computer screen or a speaker. The computer network may include one or more LANs, WANs, Internets, and computers. The computers may serve as servers, clients, or a combination thereof.

One network architecture which may be used with one embodiment of the invention is indicated generally by a system 10 in FIG. 1. The system 10 may include a network 102, which represents a computer network as previously described, providing access to and from the Data Center system.

In one embodiment of the invention, the Data Center programs and Data Center databases comprising the Data Center system preferably reside on one or more Data Center servers 104 and one or more Data Center storage mediums 106. The Data Center servers 104 and Data Center storage mediums 106 may be interconnected by a LAN 108 and a gateway 110 to the network 102. The gateway 110 facilitates access to the Data Center system from the network 102.

One example of the LAN 108 may be a corporate computing network, including possible access to the Internet, to which computers and computing devices comprising the Data Center system are connected. In one embodiment, the LAN 108 conforms to the Transmission Control Protocol/Internet Protocol (TCP/IP) industry standard. In alternative embodiments, the LAN 108 may conform to other network standards, including, but not limited to, the International Standards Organization's Open Systems Interconnection, IBM's SNA®, Novell's Netware®, and Banyon VINES®.

Those of ordinary skill in the art will recognize that the Data Center programs, the Data Center databases, and gateway functionality may advantageously be implemented on one or more computers. These computers may be uniprocessor or multiprocessor machines. Additionally, these computers include an addressable storage medium such as random access memory and may further include a non-volatile storage medium such as a magnetic or an optical disk.

In accordance with one embodiment of the invention, the Data Center server 104 is connected to the Internet and utilizes at least a first user web page remotely accessible by a potential buyer. This user web page permits the potential buyer to enter the necessary buyer and product information into the Data Center system. In another embodiment, the Data Center server 104 utilizes a second HTML page accessible by an authorized dealer. The authorized dealer utilizes this web page to access the Data Center system and features as further detailed herein. Those of ordinary skill in the art will recognize that a single web page may be used to provide both remote buyer and dealer access to the Data Center system. Further, access for a remote buyer could be through an entirely different network than that used for access by the dealer.

In one embodiment, the Data Center storage medium 106 may be configured as a database from which information can be both stored, updated, and retrieved. For example, the database may conform to the SQL standard. In an alternative embodiment, the database may conform to any database standard, or may even conform to a non-standard, private specification. The Data Center programs may provide access to the information stored on the Data Center storage medium 106. The Data Center storage medium 106 may be accessed by devices such as clients, servers, workstations, personal computers, and the like, connected to the network 102 or the LAN 108.

In one embodiment, the Data Center storage medium 106 comprises exclusive database regions. The Data Center assigns each participating dealer an exclusive database region. In another embodiment, the exclusive database regions may be created by segmenting the storage media into distinct areas, with each area assigned to a dealer. These areas or regions could be dynamically allocated by the computer depending on the amount of data to be stored as the data is entered. In another embodiment, the collection of information associated with a dealer advantageously comprises the exclusive database region for the dealer. The exclusive database region may only be accessed by the assigned dealer and the Data Center system programs.

In another embodiment, the Data Center programs may transfer the information stored on the Data Center storage medium 106 to sources external to the Data Center system. For example, vehicle inventory information may advantageously be transferred to other third-party computers connected to the network 102. A potential buyer can then access the third-party computer to view vehicle data. In yet another embodiment, the potential buyer may also submit a vehicle purchase request from the third-party computer.

Various other devices may be connected to the LAN 108. For example, a workstation 112 and a personal computer 114 may be connected to the LAN 108 to provide access to the Data Center programs and Data Center databases. In one embodiment, a printer 117 may also be connected to the LAN 108 providing local and remote printing capabilities.

The network 102 may connect devices, such as a user computer 116 or a user laptop 118, for example, by use of a modem or by use of a network interface card. As illustrated, potential buyers, may utilize such devices to remotely access the Data Center system via the network 102. The device used to provide access to the Data Center server may be referred to herein as a buyer terminal. This term is intended to include any device useful for providing access to the Data Center. The Data Center stores the purchase request directly into a dealer's database region.

A plurality of dealer computers 120 may also be connected to the network 102 through a modem or other network connection device. A vehicle dealer may advantageously use the dealer computer 120 to remotely access the Data Center system. The device used to provide access to the Data Center server may be referred to herein as a dealer terminal. This term is intended to include any device useful for providing access to the Data Center. The dealer obtains entry into the Data Center by logging in through the second HTML page of the Data Center server 104. Upon logging in, the dealer attains direct access to its exclusive database region and the contents thereof. Moreover, because a purchase request is directly stored in a dealer's database region, the dealer is immediately made aware of any newly created purchase request.

Although particular computer systems and network components are shown, those of ordinary skill in the art will appreciate that the present invention also works with a variety of other networks and components.

In one embodiment, for new vehicle sales, each zip code is an exclusive territory for a given make of vehicle. Thus, a particular dealer is advantageously assigned an exclusive sales region based upon a vehicle make and a zip code. If a new vehicle purchase request is submitted, for example, for a vehicle make A in zip code 99999, then the dealer assigned to zip code 99999 for the vehicle make A will be notified of the new vehicle purchase request. In one embodiment, a particular dealer may be assigned multiple vehicle makes as well as multiple zip codes. In another embodiment, sales regions need not be based upon zip codes. Other factors such as, by way of example, telephone area codes, cities, and counties, may advantageously provide the basis for determining sales regions.

In an alternative embodiment, one or a plurality of dealers may be assigned to a single sales region. Here, if a new vehicle purchase request is submitted, for example, for a vehicle make B in a zip code 88888, then the plurality of dealers assigned to zip code 88888 for vehicle make B will all be notified of the new vehicle purchase request.

For used vehicles, the territories are advantageously not exclusive. The dealer and buyer may separately specify a search radius. For example, each dealer may specify a search radius indicating that the dealer's used vehicles are to be offered for sale to potential buyers within the specified geographic radius from the dealer location. This could be done, for example, by utilizing zip codes to represent the area from which the dealer would accept buyers. Similarly, the buyer may specify a search radius indicating the desire to purchase a used vehicle from a dealer within the specified geographic radius from the buyer location. Thus, both the buyer's and the dealer's search radius must overlap before a potential vehicle match is considered.

The dealer and the buyer may simply specify large geographic regions, such as states, counties, or zip codes, and only those dealers and buyers within the geographic region specified by both are considered to determine a potential vehicle match. Thus, if a dealer specifies New York and New Jersey as its sales region and a buyer accesses the Data Center from Pennsylvania, then the dealer's used vehicles would not be considered for a potential sale. Likewise, if a buyer specifies an intent to purchase from New York, a Texas dealer will not be considered.

FIG. 2 illustrates an example of a record of exclusive dealer regions suitable for use with one embodiment of the invention. Advantageously, the record of exclusive dealer regions may be implemented as a matrix. The matrix may be stored in the Data Center Storage medium 106. Along the horizontal axis may be listed all the regions according to zip codes. Along the vertical axis may be listed all the available vehicle makes. Each matrix cell 202 may contain a dealer identification number uniquely identifying a dealer. In this manner, each region, and each vehicle make for that region, may be assigned to a unique dealer. In an alternative embodiment, each matrix cell 202 may contain one or a plurality of dealer identification numbers.

Figure 3:
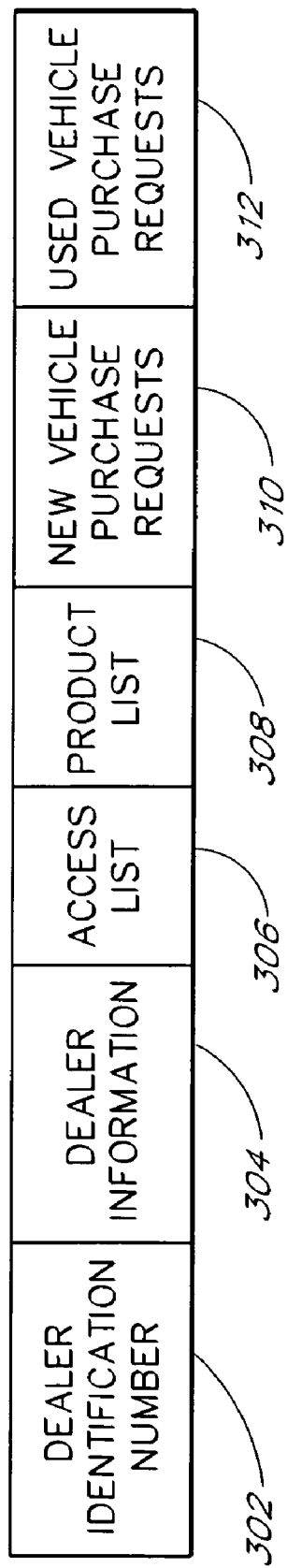
FIG. 3 is a representation of one embodiment of a dealer record of the invention.

FIG. 3 illustrates an example of a dealer record according to one embodiment of the invention. Each dealer eligible to sell through the Data Center system is assigned a dealer record. The dealer record may be stored in the dealer's exclusive database region in the Data Center storage medium 106. By way of example, six fields are illustrated comprising the dealer identification number 302, dealer information 304, access list 306, product list 308, new vehicle purchase requests 310, and used vehicle purchase requests 312. One of ordinary skill in the art will realize that any number of the fields may be broken down into additional sub-fields and that additional fields could be added.

Figure 13:
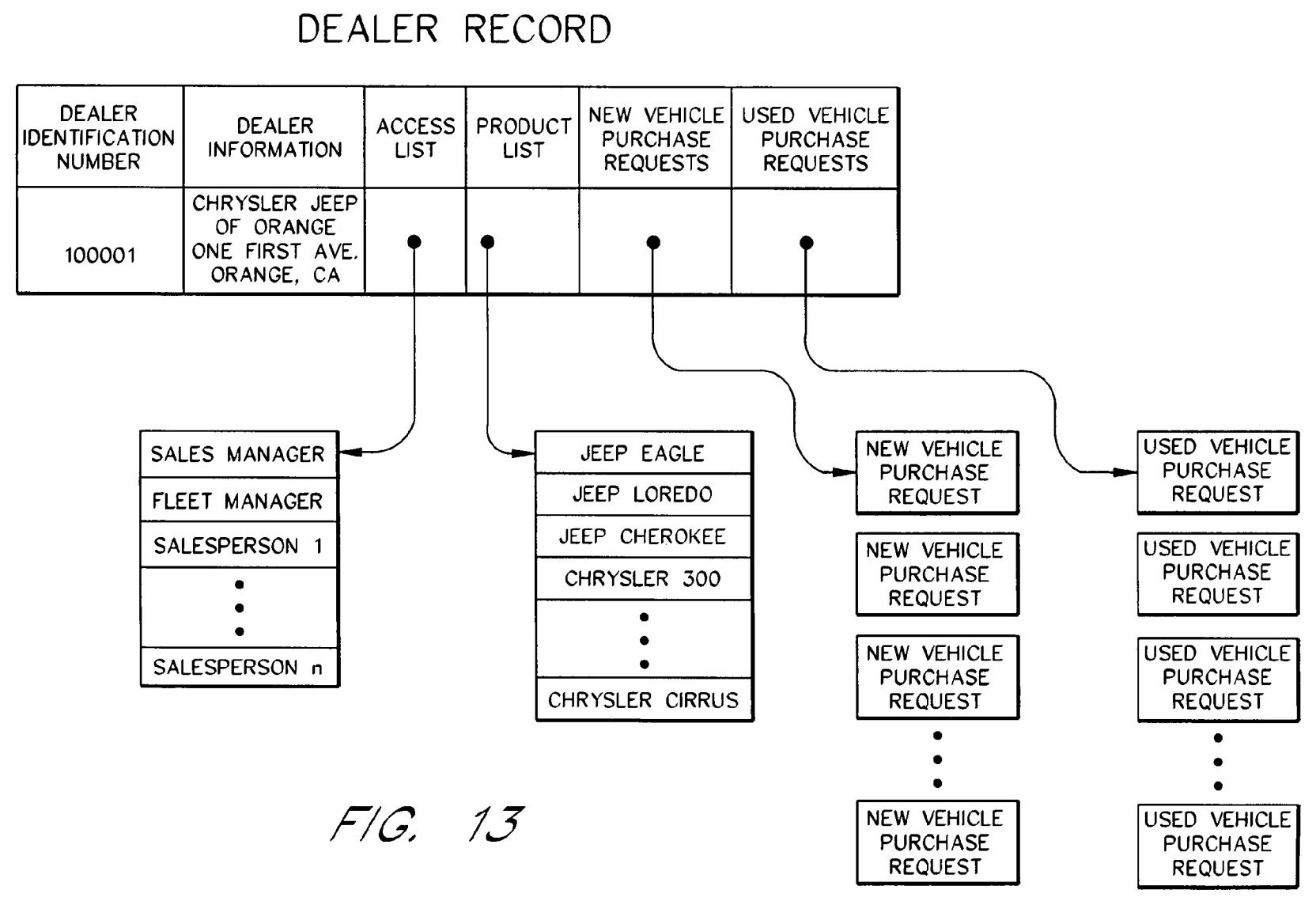

In one embodiment, the dealer information 302 may be comprised of additional fields such as, for example, a dealer name, dealer address, dealer group, and the like. FIG. 12 generally illustrates an example of a dealer record showing the contents of the record fields suitable for use with one embodiment of the invention. Furthermore, any of the dealer record fields may be implemented as pointers to other fields or other data records. For example, the product list may point to a list of new vehicle model records indicating the new vehicle models offered for sale by the dealer. FIG. 13 generally illustrates an example of a dealer record depicting certain of the fields implemented as pointers.

In one embodiment, each new vehicle model record may in turn point to a list of aftermarket product records. The aftermarket product records identify additional products offered for sale, by the dealer, for the specific new vehicle model. The aftermarket product record may be comprised of the name of an aftermarket product, a retail price for the product, a discounted price for the product, and possibly a photo showing the product.

In yet another embodiment, each new vehicle model record may further point to a vehicle model specifics record and a vehicle model accessories record. The vehicle model specifics record may identify the vehicle model specifics such as available transmission type, available number of doors, and the like. The vehicle model accessories record may identify the accessories such as leather seats, power windows, and the like, available for the vehicle model. In an alternative embodiment, the vehicle model specifics record contents and the vehicle model accessories record contents may be appropriately displayed in a web page. The buyer may then specify the desired vehicle specifics and the desired vehicle accessories.

In one embodiment, a new vehicle database may be comprised of a list of new vehicle records which may be stored in the Data Center storage medium 106. Each new vehicle model available for purchase through the Data Center system is associated with a new vehicle record. FIG. 4 illustrates a new vehicle record suitable for use with the invention. Seven fields are illustrated comprising a vehicle make 402, vehicle model 404, vehicle year 406, vehicle type 408, vehicle estimated price 410, vehicle features 412, and vehicle photo 414. It should be understood that appropriate fields may be added and a field may contain additional sub-fields. For example, the vehicle features field 412 may advantageously be comprised of a standard features field and an optional features field. In one embodiment, the vehicle type field 408 may specify whether the vehicle is a passenger car, a luxury car, a sports car, or the like.

In another embodiment, the new vehicle record fields may be implemented as pointers to other fields or other records. For example, the vehicle photo field 414 may be implemented as a pointer pointing to a representative photo of the new vehicle. Thus, the representative photo may advantageously be stored in a different region in the Data Center storage medium 106. In yet another embodiment, the vehicle year field 406 may be implemented as a pointer pointing to one or a plurality of records, each record containing, for example, a year field, a type field, an estimated price field, a features field, a photo field, and the like.

A used vehicle record identifies a used vehicle, and is created for each used vehicle offered for sale through the Data Center system. The collection of used vehicle records comprise a used vehicle inventory. The used vehicle records may be stored in the Data Center storage medium 106. For example, the used vehicle inventory may be comprised of a linked list of used vehicle records.

FIG. 5 illustrates an example of a used vehicle record suitable for use with one embodiment of the invention. Six fields are illustrated comprising the dealer identification number 302, a dealer stock number 502, vehicle make 504, vehicle model 506, vehicle information 508, and vehicle photo 510. One of ordinary skill in the art will realize that appropriate fields may be added and any number of the fields may be broken down into additional sub-fields. Furthermore, any of the fields may be implemented as pointers to other fields or other data records. For example, the vehicle photo field 510 may advantageously point to an image of the vehicle stored elsewhere in the Data Center database.

Figure 6:
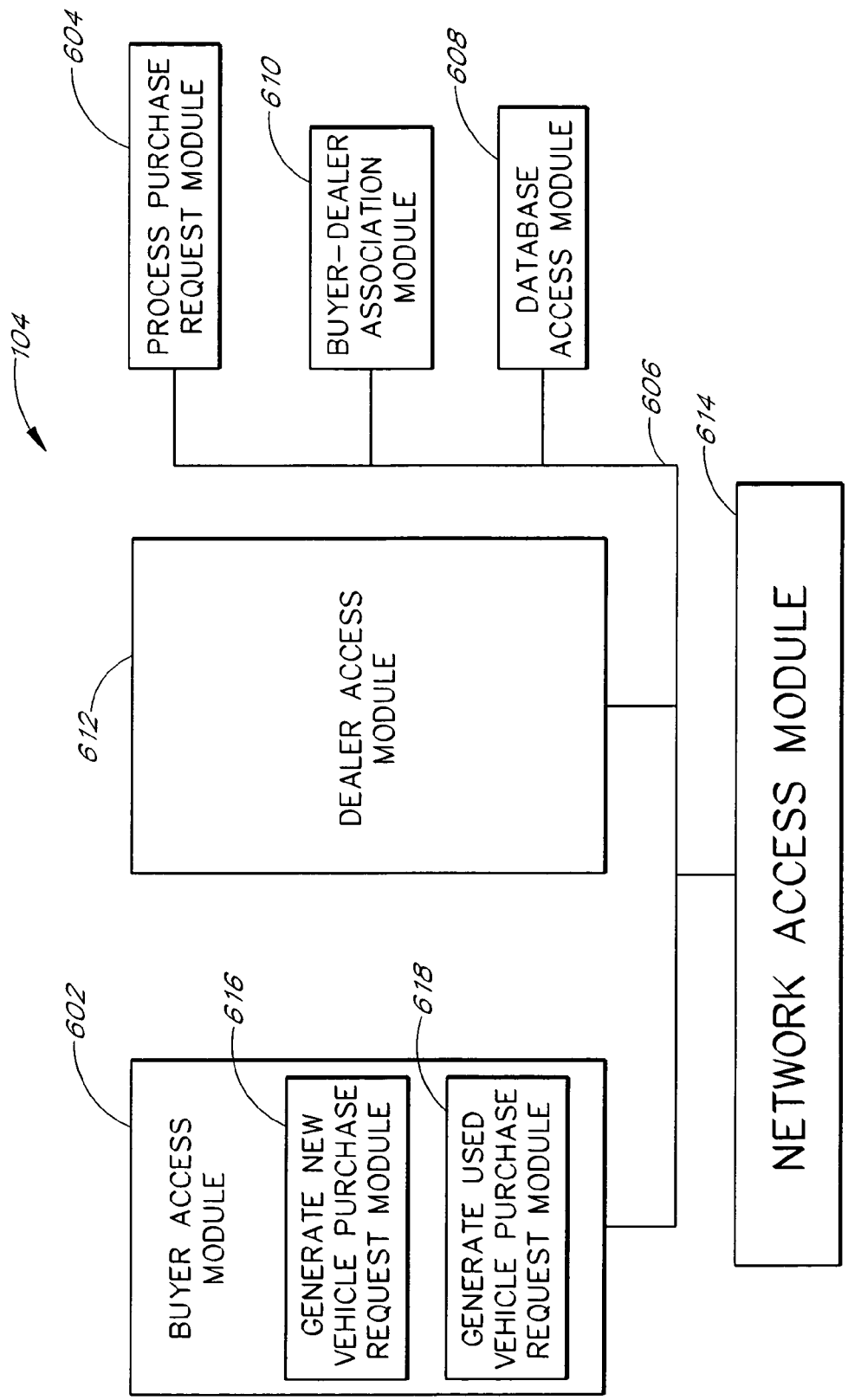
FIG. 6 is a high level block diagram illustrating one embodiment of a Data Center server system architecture of the invention.

FIG. 6 illustrates in more detail selected components of the Data Center server 104 of FIG. 1 suitable to implement one embodiment of the present invention. The Data Center server 104 includes a buyer access module 602 connected along a virtual communications path 606 to a process purchase request module 604. Also connected to the virtual communications path 606 is a database access module 608, a buyer-dealer association module 610, a dealer access module 612, and a network access module 614.

The buyer access module 602 provides a buyer an interface into the Data Center system. In one embodiment, a purchase request entry system comprises the buyer access module 602 and may facilitate a data entry environment for a buyer to enter a purchase request for a requested vehicle into the Data Center system. The buyer access module 602 may be comprised of a generate new vehicle purchase request module 616 and a generate used vehicle purchase request module 618. The generate new vehicle purchase request module 616 and the generate used vehicle purchase request module 618 may advantageously be implemented as a plurality of web pages.

In one embodiment, the web pages may advantageously be implemented in hypertext or hypermedia. Thus, the web pages may contain one or a plurality of selectable items or links. The links may provide access to other web pages contained in the Data Center system. The plurality of linked web pages guides the user in entering the necessary data to create and submit either a new vehicle purchase request or a used vehicle purchase request. In one example, FIG. 14 generally illustrates an example of a used vehicle search request for an Acura 3.5RL. Clicking on a hypertext link 1402 using a pointing device such as a mouse, or the like, may advantageously display another web page as generally illustrated by FIG. 15. Generally depicted at 1502 is the contents of the web page pointed to by the hypertext link 1402.

In another embodiment, the links may provide access to any location in the World Wide Web. For example, a link may exist to third-party web sites which advantageously provide additional product information.

The generate new vehicle purchase request module 616 facilitates a new vehicle purchase request creation and submission process. A potential buyer remotely utilizes over a network, such as the World Wide Web, at least a first web page in the generate new vehicle purchase request module 616 and provides information from which the process purchase request module 604 creates a new vehicle purchase request. Likewise, the generate used vehicle purchase request module 618 facilitates a used vehicle purchase request creation and submission process through its web pages. There may be a one-to-one correlation between a purchase request and a purchase request record.

In one embodiment, a processing system comprises the process purchase request module 604 and may facilitate the creation of a purchase request record. The process purchase request module 604 may create either a new vehicle purchase request record or a used vehicle purchase request record. The new vehicle purchase request record may be created from the information supplied through the plurality of web pages utilized during the new vehicle purchase request creation and submission process. In one embodiment, the buyer information gathered through the plurality of web pages comprising the generate new purchase request module 616 is input to the process purchase request module 604. The process purchase request module 604 creates a new vehicle purchase request record from this information. The used vehicle purchase request record may likewise be created from the information supplied through the plurality of web pages utilized during the used vehicle purchase request creation and submission process. In another embodiment, the purchase request information may also be obtained from web pages external to the Data Center system.

As one example, FIG. 16 generally illustrates one web page which may be used in the new vehicle purchase request creation and submission process. The buyer information specified in the desired vehicle model 1602 may advantageously be input to an appropriate vehicle model field 710 in an new vehicle purchase request record illustrated in FIG. 7. The new vehicle purchase request record will be further discussed below.

Figure 7:
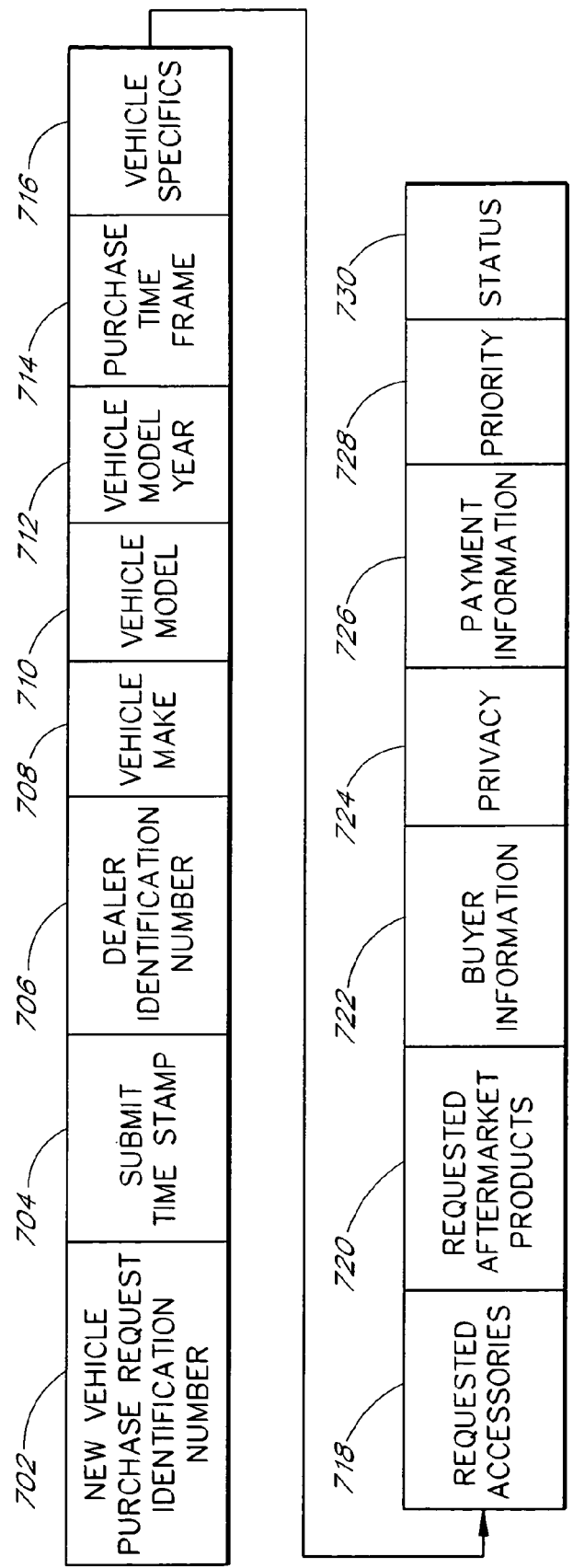
FIG. 7 is a representation of one embodiment of a new vehicle purchase request record of the invention.

FIG. 7 illustrates a set of information fields comprising a new vehicle purchase request record according to one embodiment of the invention. Fifteen fields are illustrated comprising new vehicle purchase request identification number 702, submit time stamp 704, dealer identification number 706, vehicle make 708, vehicle model 710, vehicle model year 712, purchase time frame 714, vehicle specifics 716, requested accessories 718, requested aftermarket products 720, buyer information 722, privacy 724, payment information 726, priority 728, and status 730. It should be understood that some of these fields include several sub-fields. Thus, for example, the buyer information field may include sub-fields for name, address, zip code, e-mail address, phone numbers, and contact preference. The new vehicle purchase request record may advantageously be stored in the Data Center storage medium 106.

In one embodiment, the information fields may be implemented as pointers to other fields or other records containing the information. For example, the buyer information may be implemented as a pointer. The pointer may point to a record comprised of, for example, the name, address, zip code, e-mail address, phone numbers, and contact preference. Those of ordinary skill in the art will realize that any combination of the information fields may be implemented as pointers.

In another embodiment, certain information fields may be implemented as encoded fields. For example, the requested accessories field may be implemented as a binary encoded field. Each bit position may coincide with a vehicle accessory such as an AM/FM radio, power windows, tilt wheel, overhead console, and the like. For example, a "1" in the first bit position may indicate the selection of an AM/FM Radio accessory.

Figure 8:
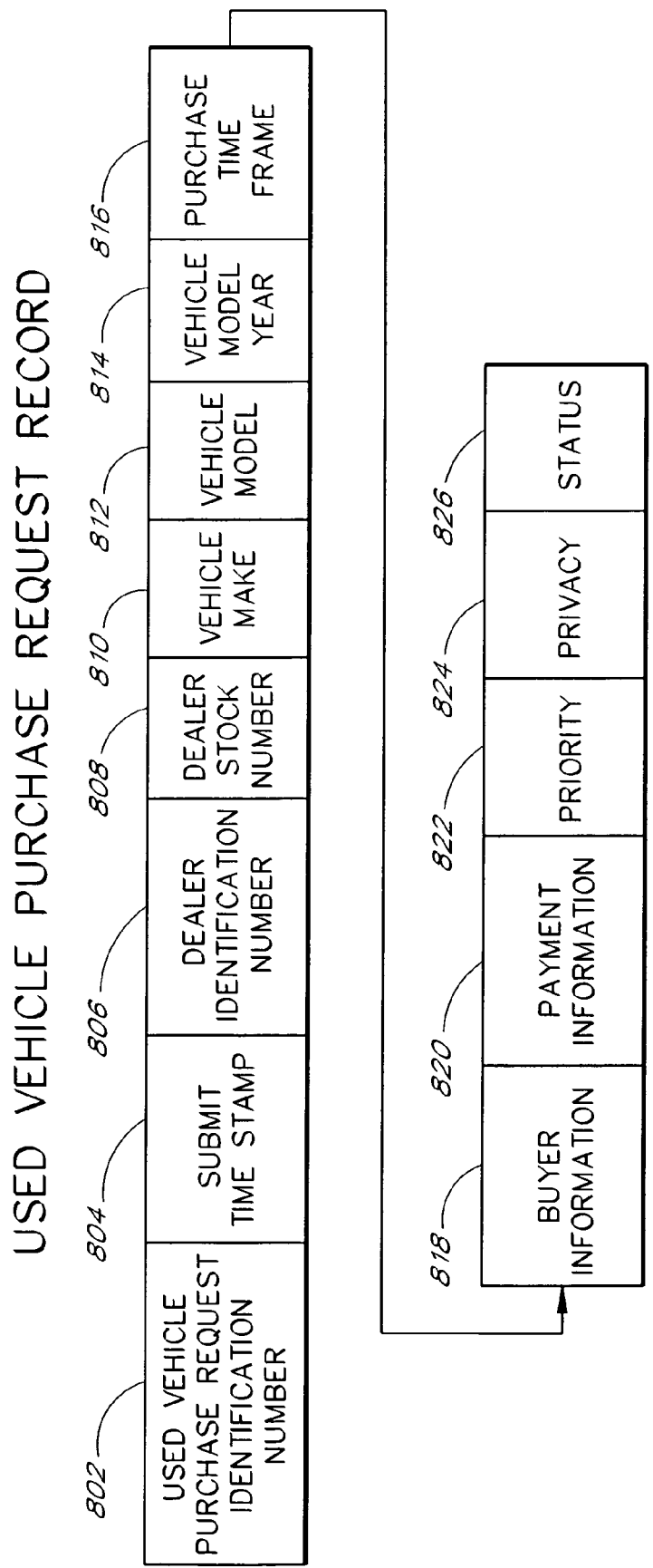
FIG. 8 is a representation of one embodiment of a used vehicle purchase request record of the invention.

FIG. 8 illustrates a used vehicle purchase request record suitable for use with one embodiment of the invention. Thirteen fields are illustrated comprising used vehicle purchase request identification number 802, submit time stamp 804, dealer identification number 806, dealer stock number 808, vehicle make 810, vehicle model 812, vehicle model year 814, purchase time frame 816, buyer information 818, payment information 820, priority 822, privacy 824, and status 826. One of ordinary skill in the art will realize that any number of the fields may be broken down into additional sub-fields. Furthermore, similar to the new vehicle purchase request record, any of the fields may be implemented as pointers, encoded fields, and the like. The used vehicle purchase request record may advantageously be stored in the Data Center storage medium 106.

In one embodiment, the process purchase request module 604 (FIG. 6) may associate the information entered by the buyer through either the generate new vehicle purchase request module 616 or the generate used vehicle purchase request module 618 with their appropriate fields in the respective purchase request record. The process purchase request module 604 may utilize the database access module 608 in storing the purchase request record in the Data Center storage medium 106 (FIG. 1). The database access module 608 will be further discussed below.

In one embodiment, the purchase request record may be completed before being stored in the Data Center storage medium 106. In another embodiment, the purchase request record fields may be stored in the Data Center storage medium 106 as the appropriate information is provided by the buyer.

In another embodiment of the invention, certain fields comprising the purchase request record may be determined by modules other than the process purchase request module 604 (FIG. 6). For example, the process purchase request module 604 may request the buyer-dealer association module 610 to identify an appropriate dealer to receive the purchase request. Accordingly, the process purchase request module 604 may advantageously pass certain purchase request information to the buyer-dealer association module 610 via the virtual communications path 606.

In one example, for a new vehicle purchase request, the buyer-dealer association module 610 may utilize the exclusive dealer regions record to determine a dealer identification number for the purchase request record. In one embodiment, as previously stated, the vehicle make and the buyer zip code may be used to determine the appropriate dealer to receive the new vehicle purchase request. The virtual communications path 606 and the buyer-dealer association module 610 will be further discussed below. In another embodiment, the dealer identification number may be passed to the process purchase request module 604 for inclusion into the dealer identification number field in the new vehicle purchase request record.

In an alternative embodiment, the exclusive dealer regions record may identify one or a plurality of dealer identification numbers. The buyer-dealer association module 610 may then create the necessary number of purchase request records, one for each of the plurality of dealer identification numbers. The dealer identification numbers may be passed to the process purchase request module 610, which may then create the necessary number of purchase request records. Thus, one or a plurality of dealers may be identified to receive a purchase request.

In one embodiment, the buyer-dealer association module 610 may advantageously determine a dealer of a used vehicle. For example, given the vehicle make, the vehicle model, and the vehicle information, the buyer-dealer association module 610 may search the used vehicle inventory to locate a vehicle matching the buyer's requirements. The used vehicle records in the used vehicle inventory may be searched to determine, for example, the dealer identification number and the dealer stock number for inclusion into the used vehicle purchase request record.

In another embodiment, the used vehicle record may also include a unique identification number. The identification number may be created by the Data Center system to identify each vehicle in the Data Center system. This identification number may advantageously be independent of the dealer stock number. This is because the stock number used by one dealer for one vehicle may be identical or very similar to a stock number selected by another dealer for another vehicle. In one embodiment, a record may associate the unique identification number to a dealer offering the vehicle for sale. The buyer-dealer association module 610 may determine the necessary information to identify the dealer, as well as the vehicle, from the identification number.

In yet another embodiment, the dealer identification number and the dealer stock number may be included into the used vehicle purchase request record by the process purchase request module 604. For example, the dealer identification number and the dealer stock number may be accessed by the process purchase request module 604 at the time the buyer requests the vehicle, or soon thereafter. The process purchase request module 604 may at that time, or soon thereafter, search the used vehicle records stored in the Data Center storage medium 106 to obtain the necessary vehicle information.

In an alternative embodiment, the buyer may specify one or a plurality of dealers to receive the purchase request. For example, the buyer may simply specify one or a plurality of dealers to receive the purchase request. In another embodiment, the buyer may specify a geographic region and a vehicle description. The Data Center system may then identify the dealers offering for sale vehicles potentially matching the specified vehicle description in the specified geographic region. Then, every identified dealer may receive the purchase request.

According to one embodiment of the present invention, the process purchase request module 604 may further associate the purchase request record with the appropriate dealer record. For example, a new vehicle purchase request record may, upon creation, or soon thereafter, be logically connected to the dealer record new vehicle purchase requests field 310. The logical connection may be in the form of, for example, a direct entry of the new vehicle purchase request record into the new vehicle purchase requests field, or an entry into a list of new vehicle purchase request records pointed to by the new vehicle purchase requests field. The same association may be made between a used vehicle purchase request record and the dealer record used vehicle purchase requests field 312.

Figure 9:
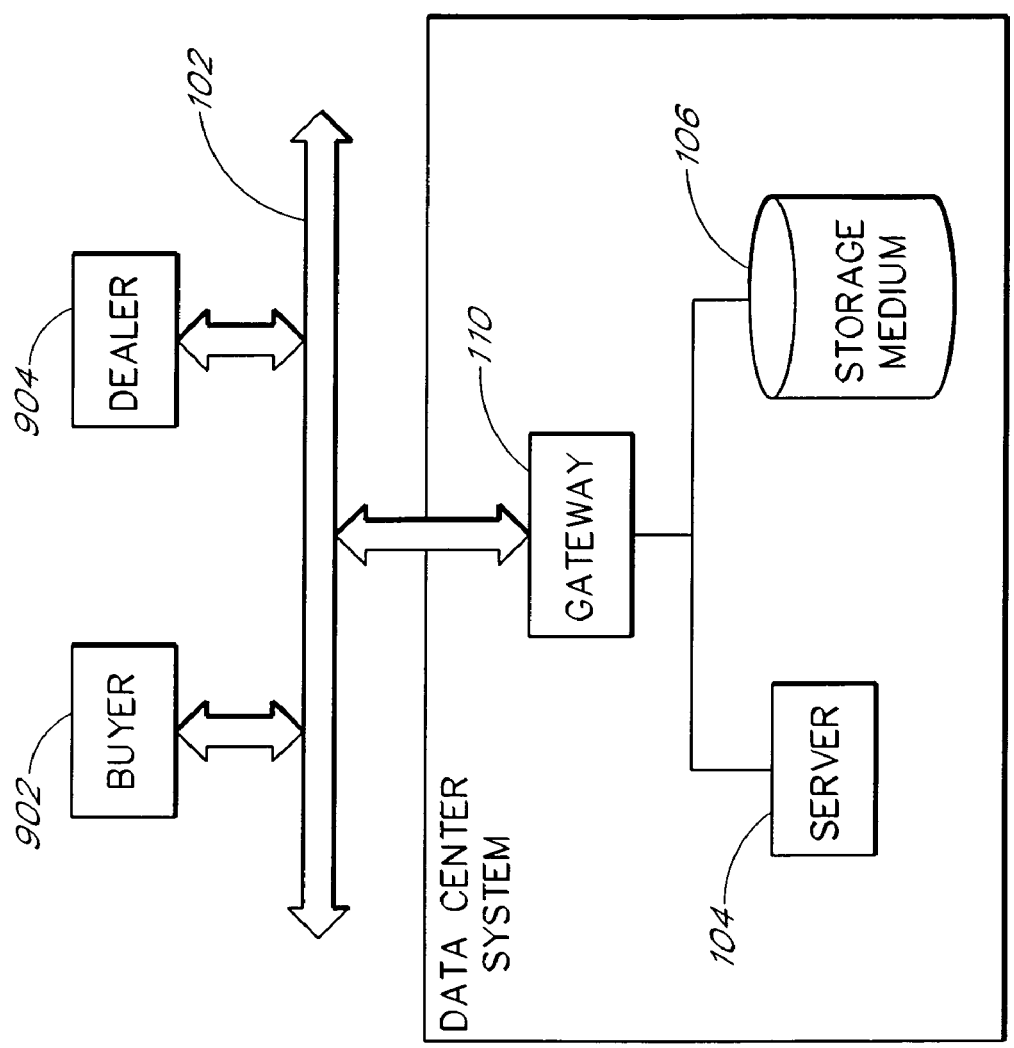
FIG. 9 is a block diagram illustrating one embodiment of a communication between a buyer, a seller, and components of a Data Center system.

FIG. 9 is a block diagram illustrating one embodiment of a communication between a buyer 902, a dealer 904, and components of the Data Center system. More particularly, a communication between the buyer 902, the dealer 904, a Data Center server 104, and a Data Center storage medium 106 is illustrated. The buyer 902 may access the Data Center server 104, through the network 102 and the gateway 110, to create and submit a purchase request in the Data Center system. The Data Center server 104 creates and stores the purchase request, as a purchase request record, in the Data Center storage medium 106. The purchase request is stored such that the dealer 904 may identify the purchase request at the time the purchase request record is created, or soon after.

Figure 17:
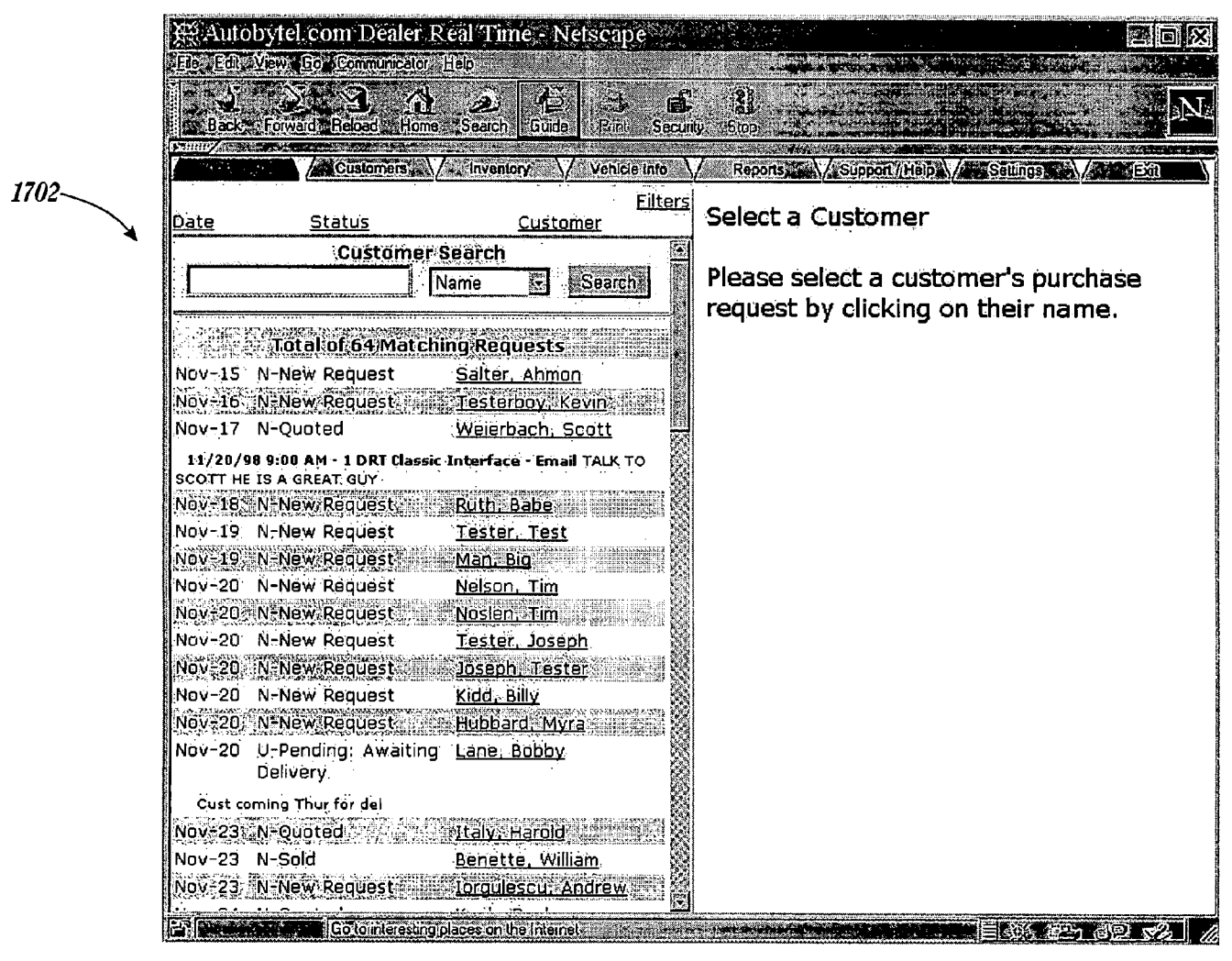

In one embodiment, the buyer 902 utilizes the components of the Data Center server 104 to create and store a purchase request record in the dealer's exclusive database region in the Data Center storage medium 106. The purchase request record is stored immediately upon the completion of the purchase request creation and submission process. The dealer 904 may access its database region to obtain a listing of its purchase requests. FIG. 17 generally illustrates a HTML page suitable for use in an embodiment of the invention. A scrollable list of purchase requests, advantageously implemented as links, is displayed generally at 1702. Immediately upon the creation of the purchase request record in the dealer 904 exclusive database region, the list of purchase requests is updated to show the just created purchase request.

The dealer 904 may access the Data Center system through the network 102 and the gateway 110. The dealer 904 remotely accesses the Data Center system over the network 102 by providing a Universal Resource Locator (URL) to identify the Data Center system. Dealers advantageously access the Data Center by providing a URL and preferably not over the world wide web. Thus, access to the Data Center system may advantageously be restricted to those who know the URL and is not as readily reachable by web search engines.

The dealer 904 may access its dealer record and, more particularly, its purchase request records, through the Data Center Server 104. In one embodiment, the appropriate dealer record field contains information from which the purchase request records may be identified and accessed. Alternatively, the purchase request records may contain information identifying the dealer 904. Thus, the purchase request is delivered and communicated to the dealer in real time, upon the creation of the purchase request record, or soon after.

In one embodiment, a dealer may be notified of a newly created purchase request record upon accessing the Data Center system. In another embodiment, the dealer may be notified of a purchase request created while the dealer is concurrently accessing the Data Center system. For example, the dealer may be viewing a screen displaying a list of purchase requests as illustrated in FIG. 17. The appropriate field in the dealer record may be updated to identify the newly created purchase request while the dealer is accessing the Data Center system through a computer 120. Then, the screen may advantageously be refreshed to display a list containing the newly created purchase request immediately upon the creation of the purchase request record, thereby communicating to the dealer the purchase request. In yet another embodiment, the dealer may immediately be notified of a new purchase request via communication mechanisms such as e-mail, page, telephone message, or the like, which are triggered in response to the receipt of the purchase request in the dealer record.

Conventional purchase request delivery systems utilize some degree of batch processing before a purchase request notification is generated. In conventional systems, the delivery is generally by fax, phone call, or e-mail, and the notification occurs at a time significantly after the submission of the purchase request. In contrast, this invention advantageously provides for a real time delivery of a purchase request to the appropriate dealer. The purchase request delivery and notification occur when the purchase request record is created, or soon after. Moreover, unlike conventional notification systems, the buyer need not specify a recipient dealer. This contemplate, however, that the system may permit the buyer to select a recipient dealer or dealers.

The virtual communications path 606 (FIG. 6) facilitates communication amongst the modules comprising the Data Center server 104 (FIG. 1). The virtual communications path 606 may be implemented as a procedure or a function call interface. In an alternative embodiment, the virtual communications path 606 may be implemented as an interprocess communication method. For example, the modules comprising the Data Center server 104 may be implemented as one or a plurality of software processes. The various software processes may then communicate with one another by means of interprocess communication. Those of ordinary skill in the art will realize that the modules comprising the Data Center server 104 may be distributed amongst a plurality of Data Center servers 104 utilizing well known distributed technology techniques.

The database access module 608 provides an interface to the information stored on the Data Center storage medium 106. The database access module 608 thus enables the Data Center server 104 modules to be implemented independent of the Data Center storage medium 106 specifics. This enables the Data Center storage medium 106 specification to be altered without impacting the various modules, other than the data base access module 608, comprising the Data Center server 104.

In one embodiment, as previously mentioned, the Data Center storage medium 106 may be configured as a SQL database. The database access module 608 implements the specifics of the SQL commands to interact with the Data Center storage medium 106. Thus, other modules comprising the Data Center server 104 may be developed independent of the SQL specifics. For example, if the Data Center storage medium 106 is re-developed as a DB2 database, only the database access module 608 needs to be updated. The other modules comprising the Data Center server 104 need not be re-developed.

The buyer-dealer association module 610 associates a purchase request and an appropriate dealer. In one embodiment, the buyer-dealer association module 610 may receive purchase request information from the process purchase request module 604 via the virtual communications path 606. The buyer-dealer association module 610 may then access the Data Center storage medium 106, utilizing the database access module 608 and the network access module 614, to determine the appropriate dealer for the purchase request. In one embodiment; as previously stated, the buyer-dealer association module 610 may advantageously determine an appropriate dealer to receive the purchase request from the vehicle make and the buyer zip code.

Figure 10:
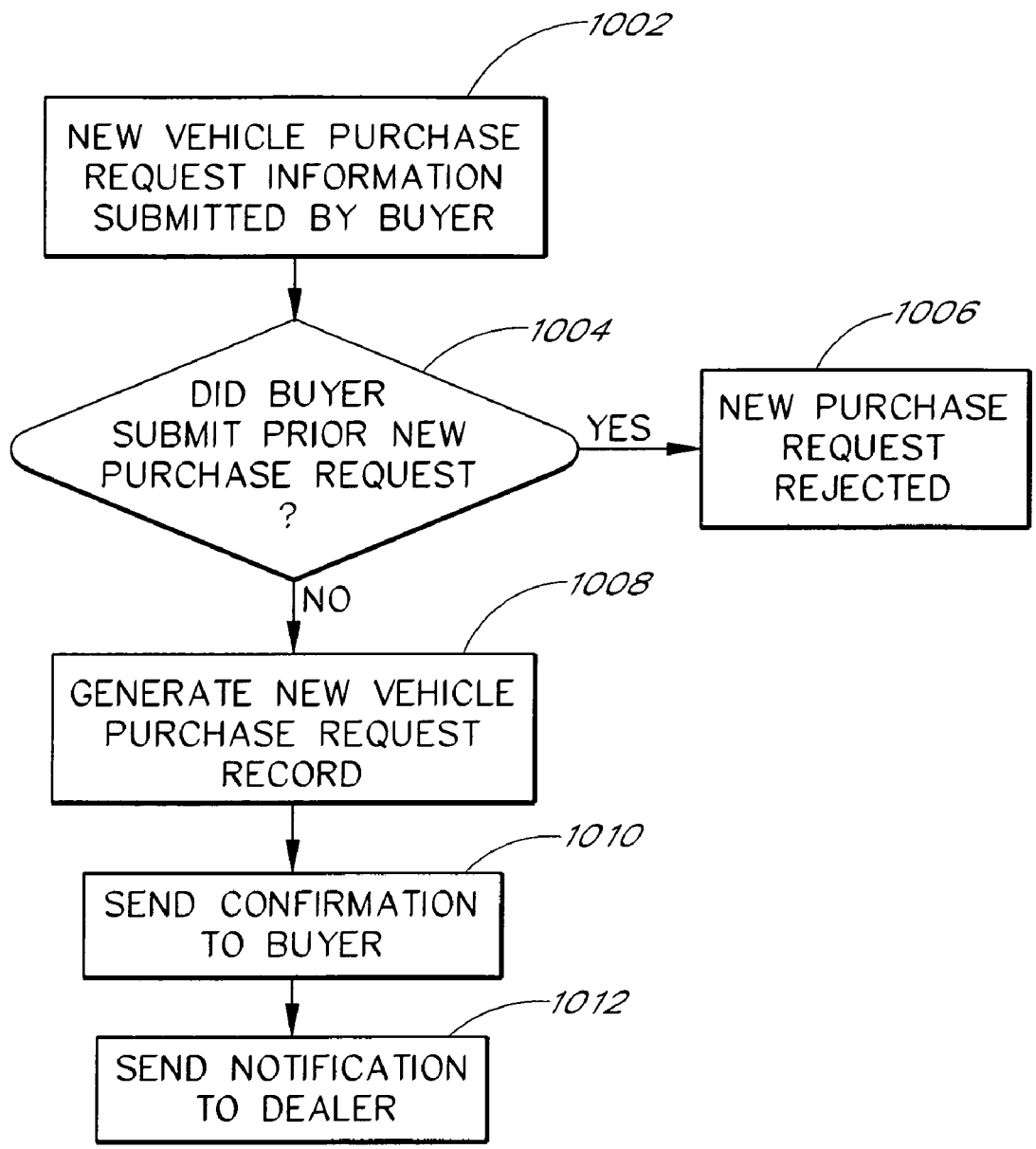
FIG. 10 is a flow chart illustrating a real time new vehicle purchase request submission and delivery process in accordance with one embodiment of the invention.

FIG. 10 is a flow chart generally illustrating a real time new vehicle purchase request submission and communication process according to one embodiment of the present invention. In particular, at a step 1002, the new vehicle purchase request information is submitted by the buyer. The buyer may utilize the generate new vehicle purchase request module 614 to submit the information pertaining to the new vehicle purchase request. In one embodiment, the buyer information may be passed to the process purchase request module 604 as the buyer information is entered through each web page, or soon thereafter. In another embodiment, the buyer-dealer association module 610 determines the appropriate dealer from the record of exclusive dealer regions once the buyer enters a requested vehicle model and a buyer zip code, or soon thereafter.

Once the buyer information is entered, the Data Center system moves to a step 1004 wherein a check is performed to determine if the buyer has previously submitted a new vehicle purchase request within the previous 48 hours. In one embodiment, a list of new vehicle purchase request records may be searched to determine if the buyer has previously submitted a new vehicle purchase request. In another embodiment, the list of new vehicle purchase request records may be sorted based on the submit time stamp. Thus, only the new vehicle purchase request records submitted within 48 hours need to be searched. In yet another embodiment, the list of new vehicle purchase request records may further be sorted according to dealer identification number, thus requiring a search of even a smaller number of new vehicle purchase request records.

In one embodiment, in step 1004, a buyer address may be used as the criteria for determining if the buyer previously submitted a new vehicle purchase request within the past 48 hours. If the buyer previously submitted a new vehicle purchase request, then the Data Center system moves to step 1006 and rejects the present new vehicle purchase request. Also, the buyer may be presented with an error message indicating the rejection of the newly submitted purchase request.

If the buyer has not submitted a new vehicle purchase request within the prior 48 hours, the Data Center system moves to a step 1008 wherein a new vehicle purchase request record is created by the process purchase request module 604 and is stored in the appropriate dealer's exclusive database region in the Data Center storage medium 106. In one embodiment, the process purchase request module 604 may generate a unique number to identify the new vehicle purchase request record. This unique number may be associated with the new vehicle purchase request identification number field 702 illustrated in FIG. 7. The Data Center system then moves to step 1010 wherein a confirmation is sent to the buyer. For example, the confirmation may be a web page displaying the purchase request number.

At a step 1012, the new vehicle purchase request record is added to the appropriate dealer record new vehicle purchase requests field 310. In one embodiment, as generally illustrated in FIG. 13, the new vehicle purchase requests field 310 may point to a list of new vehicle purchase request records. The current new vehicle purchase request record may be added to the existing list of new vehicle purchase request records. The current new vehicle purchase request record is immediately displayed in the list of purchase requests as generally illustrated at 1702 in FIG. 17. In another embodiment, the dealer record new vehicle purchase requests field may additionally comprise a status flag indicating the new arrival of a newer vehicle purchase request.

In another embodiment, the dealer record advantageously comprises one or a plurality of beeper numbers to be called upon the delivery of a new vehicle purchase request. The process purchase request module 604 may result in the creation of an e-mail message including, for example, beeper number or numbers for the e-mail paging service to call, and address to an e-mail to pager service. The e-mail message may then be submitted to the e-mail paging service. The e-mail paging service may then perform the paging, or dialing, function. As is well known in the art, suitable e-mail message paging services are available from companies such as Pagenet, Skytel, and MCI.

Figure 11:
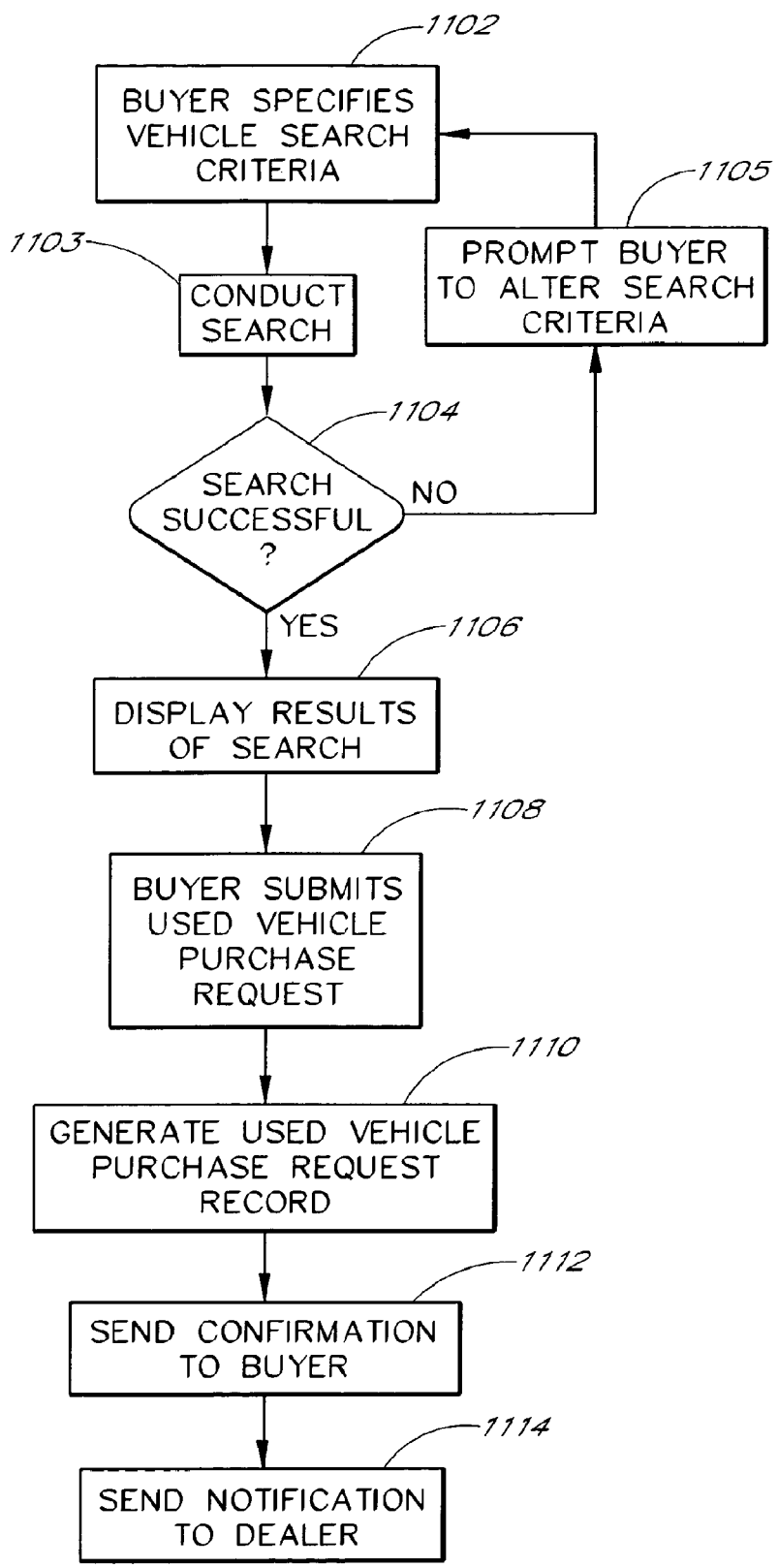
FIG. 11 is a flow chart illustrating a real time used vehicle purchase request submission and delivery process in accordance with one embodiment of the invention.

FIG. 11 is a flow chart generally illustrating a real time used vehicle purchase request submission and delivery process according to one embodiment of the invention. In particular, at a step 1102, the buyer may submit information generally describing a vehicle. To do this, the buyer uses the generate used vehicle purchase request module 616. In one embodiment, the buyer may specify information such as a vehicle make, a vehicle model, and the like.

Once the buyer submits his or her search criteria, which generally describes the vehicle, the Data Center system moves to step 1103 and conducts a search, based on the submitted search criteria, of the used vehicle records comprising the used vehicle inventory in the Data Center storage medium 106. In one embodiment, the generate used vehicle purchase request module 618 may utilize the database access module 608 to perform the search. If the search is unsuccessful at step 1104, the Data Center system moves to a step 1105 wherein the buyer is prompted to alter the search criteria. The Data Center system then moves to step 1102 and functions as described above.

In one embodiment, if it is determined in step 1104 that the search was successful, the Data Center system moves to step 1106 wherein the results of the search are displayed to the buyer. In this step, the buyer may also view a more detailed description of one or more vehicles found in the search. Having decided on an appropriate vehicle, the buyer may create a purchase request for that vehicle which is submitted to the Data Center system at a step 1108.

At a step 1110, the process purchase request module 604 creates a used vehicle purchase request record in the appropriate dealer's exclusive database region in the Data Center storage medium 106. In this step, the buyer-dealer association module 610 may determine the dealer offering the used vehicle for sale. In one embodiment the process purchase request module 604 may generate a unique number to identify the used vehicle purchase request record. This unique number may be associated with the used vehicle purchase request identification number field 802 illustrated in FIG. 8.

In one embodiment, a confirmation is sent to the buyer at a step 1112. For example, the confirmation send may be a web page displaying the purchase request number. At a step 1012, the used vehicle purchase request record is stored and identified in a manner similar to a new vehicle purchase request record. Thus, the purchase request is communicated to the dealer in real time. Consequently, the dealer may appropriately act on the purchase request upon its submission, or shortly after. A notification is sent to a dealer at a step 1114.

The network access module 614 (FIG. 6) provides the modules of the Data Center Server 104 (FIG. 1) a uniform interface to the LAN 108. In one embodiment, the network access module 614 may be implemented as an application program interface. The network access module 614 enables the Data Center server 104 modules to be implemented independent of the underlying network specifics. Thus, the underlying network specifics may be altered without impacting the various modules, other than the network access module 614, comprising the Data Center server 104.

The dealer access module 612 provides a dealer an interface into the Data Center system. In one embodiment, a dealer management system comprises the dealer access module 612 and may facilitate the dealer's managing its purchase requests. More particularly, a dealer may directly access its exclusive database region, and the information contained therein, by logging into the Data Center system through the dealer access module 612. In one embodiment, the dealer access module 612 may be implemented as a plurality of HTML pages providing the dealer a mechanism to access its exclusive database region. The Data Center system may advantageously communicate to the dealer its purchase requests through one or a plurality of the HTML pages. An example of one such HTML page is illustrated in FIG. 17. The dealer may also advantageously perform real time operations such as, purchase request management, inventory management, and the like, through the plurality of HTML pages.

Figure 18:
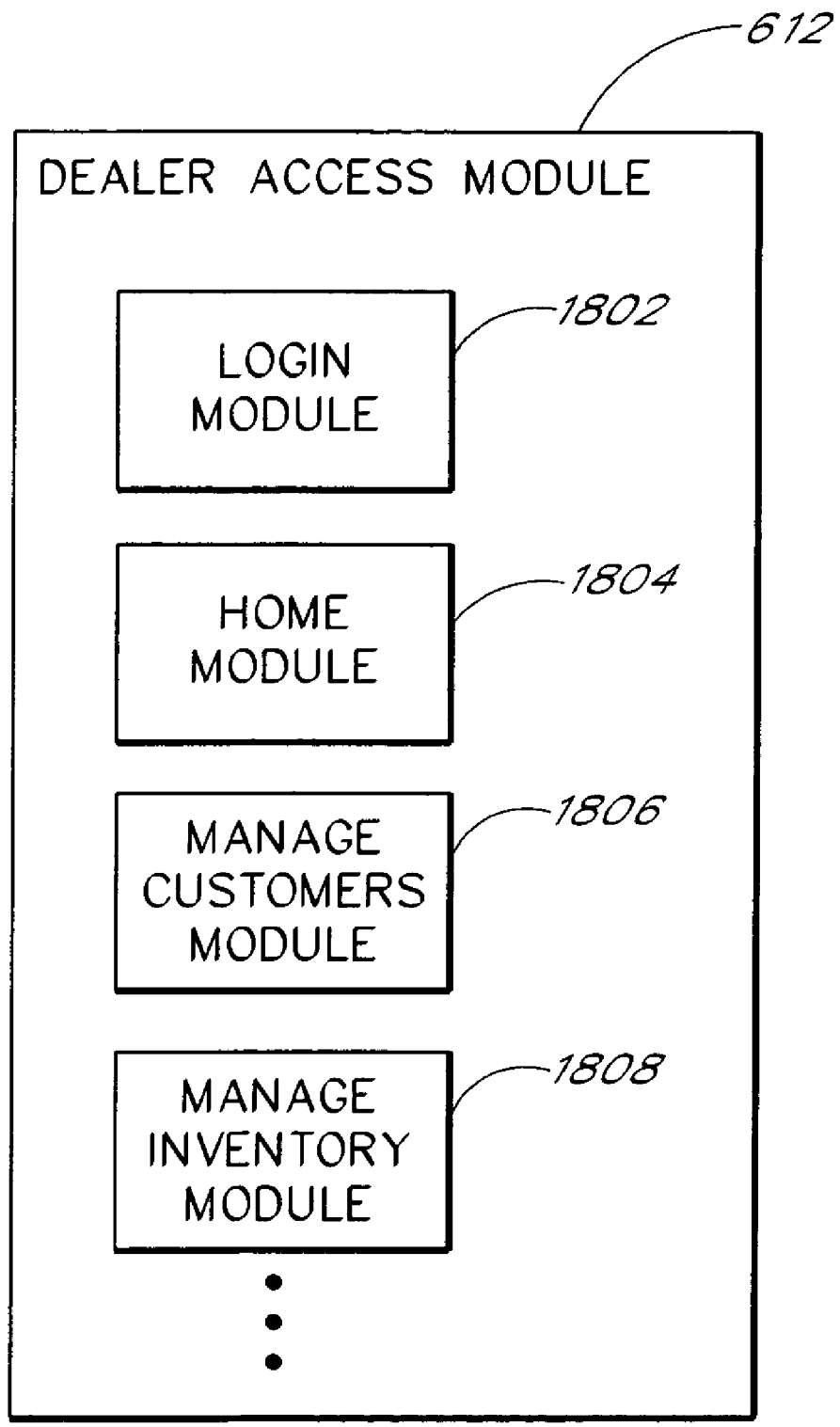
FIG. 18 is a high level block diagram illustrating one embodiment of the selected components contained in the dealer access module.

FIG. 18 illustrates selected components of the dealer access module 612 suitable to implement one embodiment of the invention. The dealer access module 612 may be comprised of a login module 1802, a home module 1804, a manage customers module 1806, and a manage inventory module 1808, as well as other modules. The modules may be comprised of one or a plurality of linked HTML pages which enable the participating dealers to interact with the Data Center system. The modules may further comprise one or more action response modules, such as, by way of example, purchase request management module, purchase request listing module, purchase request detail display module, status change module, associate task module, modify task module, and list tasks module, which enable a user to efficiently manage purchase requests.

In one embodiment, each participating dealer or dealer group is provided with a dealer group login account which the dealer uses to access the Data Center system. Initially, there are ordinarily no users set up in the dealer group login account. Associated with each dealer group login account is a unique dealer group profile record identifying certain characteristics of the dealer group as well as other tunable characteristics. The dealer logs into the system using a login identification and a password. Upon initially logging into the Data Center system, the dealer creates one or more users with which to access the system. A user can be, for example, a dealer, sales manager, salesperson, or anyone associated with a dealer or dealer group, and who may properly access the exclusive database region and the information contained therein.

A user profile record substantially similar to the group profile record is associated with each user. The user profile record is initially created by the dealer at the time the dealer creates the user. The user profile record comprises one or more filter conditions, and the user profile record is used to filter the information contained in the dealer's exclusive database region. For example, a sales manager may have specified that only purchase requests with "sold" status is to be displayed. Then, for this sales manager, only purchase requests with "sold" status will be displayed. All other information in the exclusive database region will be filtered out. In this and subsequent examples, the use of "user" is not intended to be limiting, but for clarity, examples may also be provided using titles such as, by way of example, sales manager, salesperson A, and salesperson B.

Figure 28:
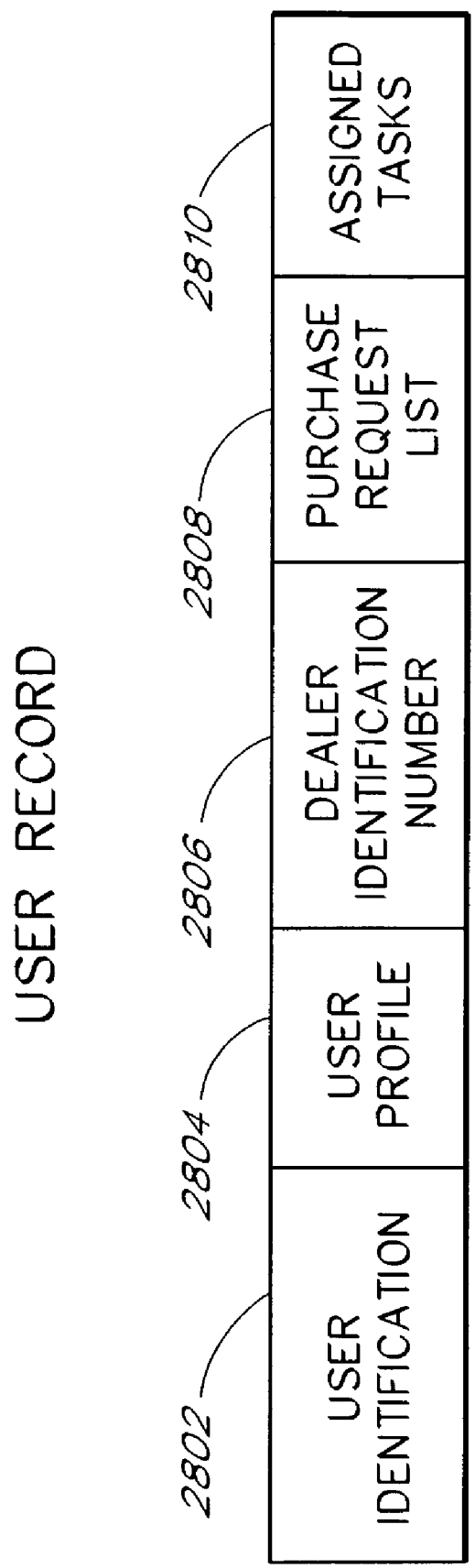
FIG. 28 is a representation of one embodiment of a user record of the invention.

FIG. 28 illustrates an example of a user record according to one embodiment of the invention. The Data Center system advantageously stores a user record for each user created by each dealer or dealer group login account. The user record may advantageously be stored in the dealer's exclusive database region. By way of example, five fields are illustrated comprising a user identification 2802, user profile 2804, dealer identification number 2806, purchase request list 2808, and assigned tasks 2810. One of ordinary skill in the art will realize that any number of the fields may be implemented as pointers to other records or fields, may be broken down into additional sub-files, and that additional fields could be added.

In one embodiment, a first HTML page comprising the login module 1802 may be accessed via the Internet by a person associated with a dealer to access the Data Center system. As an example, a person associated with a dealer may advantageously provide a login identification and password pair associated with a dealer group account utilizing the first HTML page. Having provided a valid login identification and password pair, a second HTML page may request the person to identify himself or herself by selecting a user from a list of users associated with the dealer group account and previously created. Upon selecting a user, a first HTML page of the home module 1804 may be displayed. In another embodiment, the person may utilize the login module 1802 to create additional users belonging to the dealer group, delete existing users from the dealer group, and modify existing user profiles in the dealer group.

Figure 19:
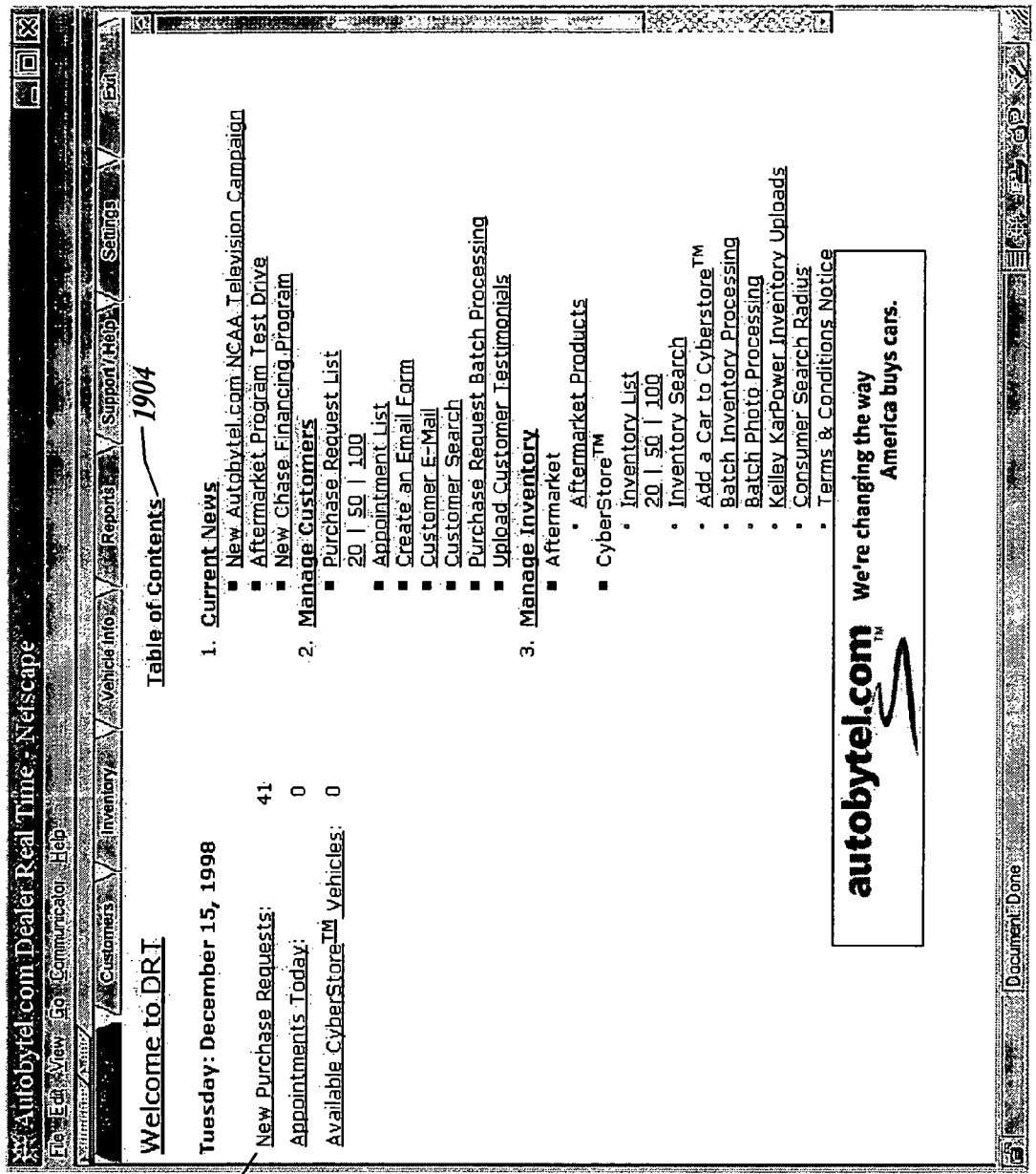
FIG. 19 is a representation of one embodiment of an HTML page of the home module.

In one embodiment, the home module 1804 may advantageously provide the user access to the features and components comprising the dealer access module 612. FIG. 19 generally illustrates such an HTML page of the home module 1804. The HTML page contains a master table of contents 1904 providing a summary listing of the features and contents of the dealer access module 612. The summary listing may advantageously be tiered to better illustrate the organization of the dealer access module 612. For example, each module comprising the dealer access module 612 is listed in the first tier while each module's components is listed in the second tier. Additionally, other summary information pertaining to the user such as, by way of example, a number of new purchase requests, and a number of appointments today, may advantageously be presented. The summary information displayed may be dependent on the particular user profile record and may also be tiered.

Each entry in the master table of contents 1904 is preferably implemented as a hypertext link providing direct access to a linked HTML page. In another embodiment, the other summary information contents may also be implemented as a list of links to other HTML pages containing more detailed information. For example, clicking on the new purchase request link 1902 with a pointing device such as a mouse, or the like, may further display an HTML page listing the new purchase requests as generally illustrated in FIG. 17. Tabs may also be implemented to provide direct access to specific HTML pages comprising the dealer access module 612.

The purchase request management module advantageously comprises the manage customers module 1806 and may facilitate the efficient real time management of a dealer's purchase requests. A user utilizes the manage customers module 1806 to access the purchase requests submitted to the dealer. Several properties may advantageously be associated with a purchase request such as, by way of example, a purchase request status, a purchase request priority, and a purchase request task. The user may advantageously perform operations such as associating a status to a purchase request, determining a purchase request priority, scheduling activities and assigning tasks based upon the purchase request priority, associating a task to a purchase request, assigning a purchase request task to a user, and the like.

Figure 20:
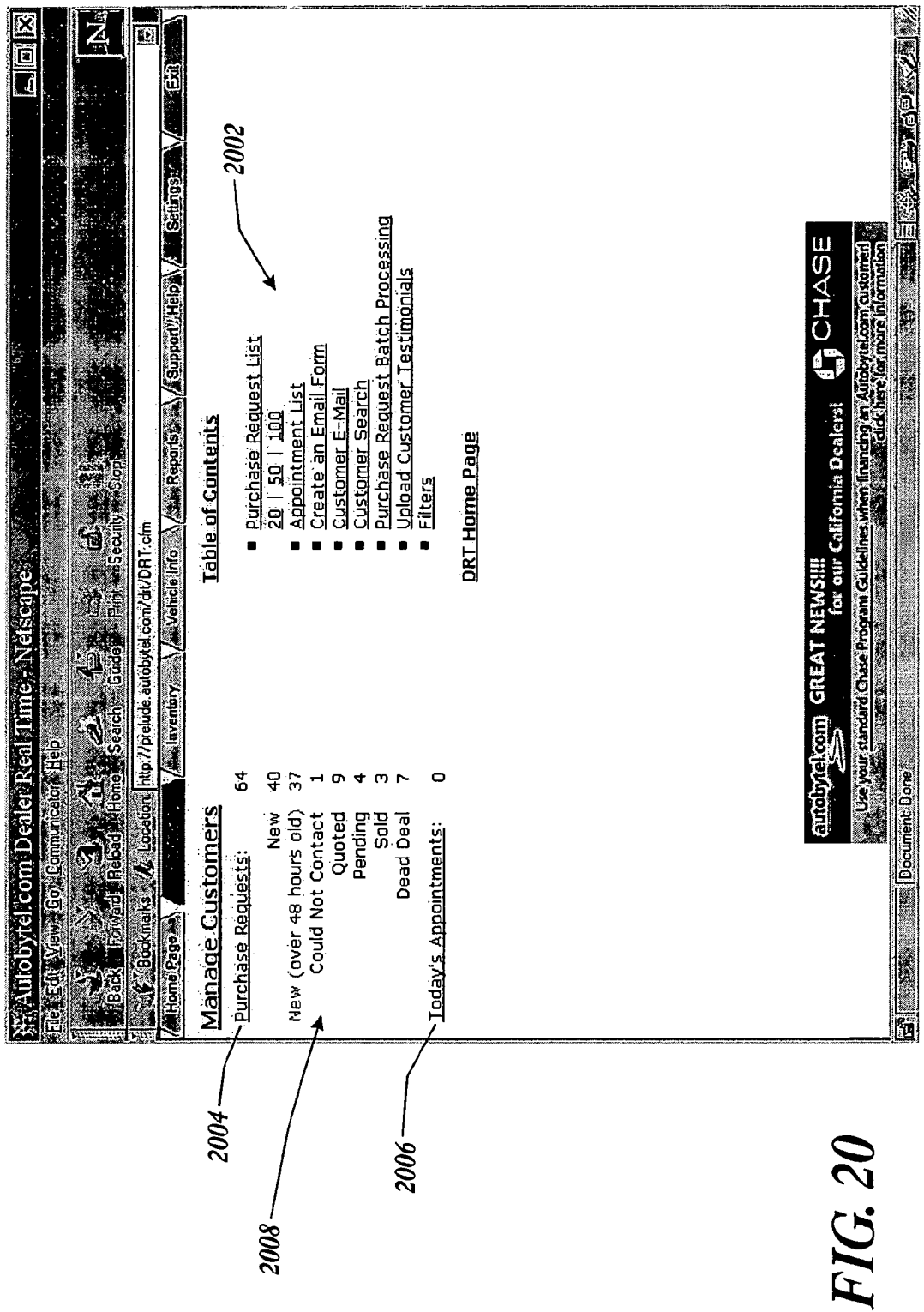
FIG. 20 is a representation of one embodiment of a first HTML page of the manage customers module.

FIG. 20 generally illustrates a first HTML page of the manage customers module 1806. A table of contents listing the contents of the manage customer module 1806 is displayed generally at 2002. A total number of purchase requests satisfying the filtering conditions specified in the user profile field 2804 is specified at a purchase requests total 2004. A number of appointments for the user scheduled for the current day is specified at a today's appointments total 2006.

In one embodiment, the total number of purchase requests may be obtained by searching through the contents of both the new vehicle purchase requests field 310 and the used vehicle purchase requests field 312 of the appropriate dealer record and determining the number of purchase requests satisfying the filtering conditions. The purchase requests satisfying the filtering conditions may advantageously be identified by the new vehicle purchase request identification number 702 or the used vehicle purchase request identification number 802. These identification numbers may be stored in the purchase request list field 2808 in the user record for quick and efficient reference. Those of ordinary skill in the art will realize that there are other methods of identifying the purchase requests satisfying the filtering conditions such as maintaining another copy of the purchase request record in the database, creating a record of database links pointing to the purchase request records satisfying the filtering conditions, and the like.

In one embodiment, each purchase request is identified by a status such as new, could not contact, quoted, pending, sold, and dead deal. The Data Center system initially assigns a status of "new" to each purchase request submitted to the system. This status may advantageously be stored in the status field 730 in the new vehicle purchase request record or the status field 826 in the used vehicle purchase request record. As is generally illustrated at 2008 in FIG. 20, the number of purchase requests may be listed according to the purchase request status. In an alternative embodiment, the list may be comprised of links to other HTML pages which provide the user a more detailed purchase request listing such as that shown in FIG. 17.

Figure 21:
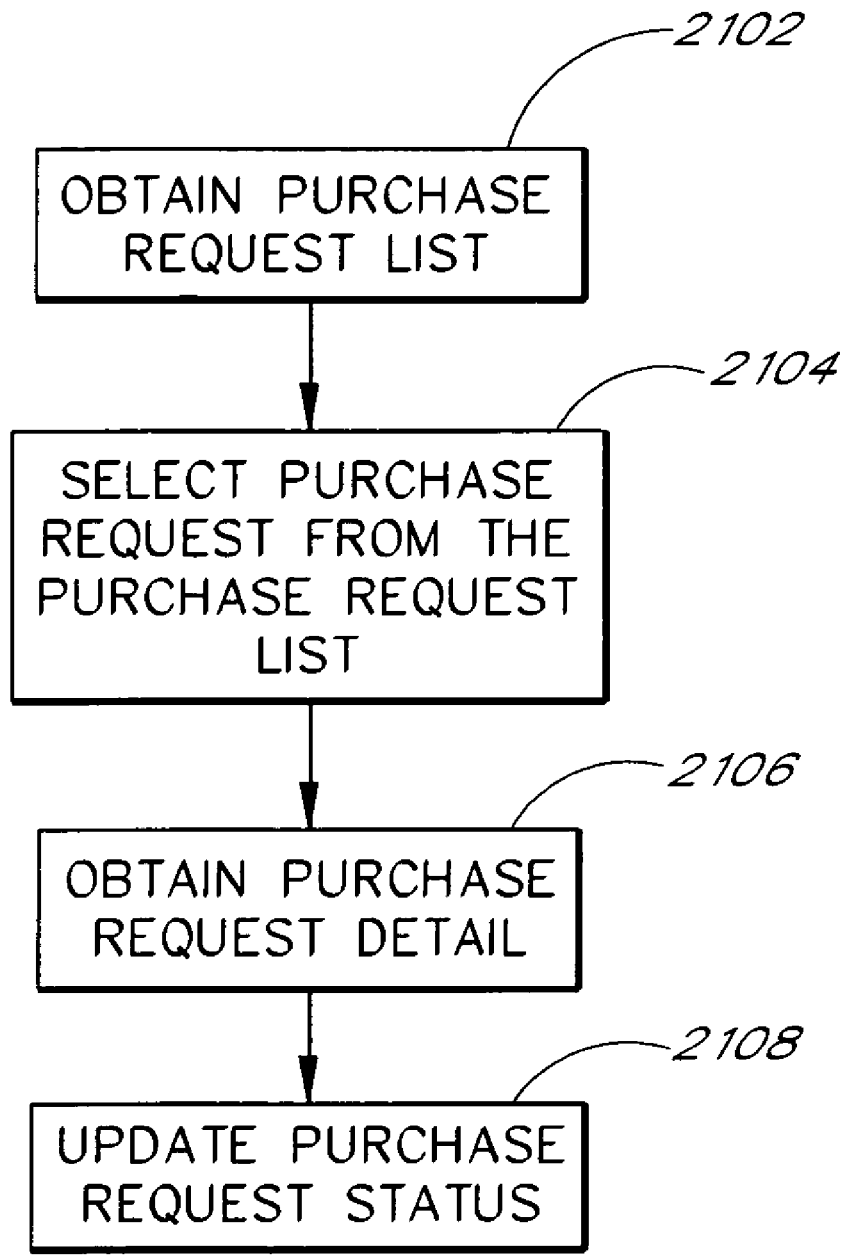
FIG. 21 is a flow chart illustrating a real time setting of a purchase request status in accordance with one embodiment of the present invention.

FIG. 21 is a flow chart generally illustrating a real time setting of a purchase request status according to one embodiment of the invention. In particular, at a step 2102, the user utilizes a purchase request listing module to obtain a listing of the purchase requests satisfying the filter conditions specified in the user profile field 2804 in the user record. As an example, a salesperson may click on the purchase requests total link 2004 (FIG. 20) using a pointing device such as a mouse, or the like, to access an HTML page displaying the list of purchase requests. Such a list suitable for use with one embodiment of the invention is generally illustrated by a purchase request listing 2202 in FIG. 22.

The purchase request listing module may list the purchase requests according to date, status, and customer name. Also, the purchase requests may advantageously be displayed with alternating backgrounds to better distinguish one purchase request from the next. In another embodiment, the purchase requests may be displayed in differing colors based upon, for example, the status and the date. Thus, for example, new purchase requests that have not been acted on for 48 hours may be displayed in red to indicate that some action should be taken. The displayed information is obtained from the appropriate fields in the new vehicle purchase request records and the used vehicle purchase request records.

Figure 22:
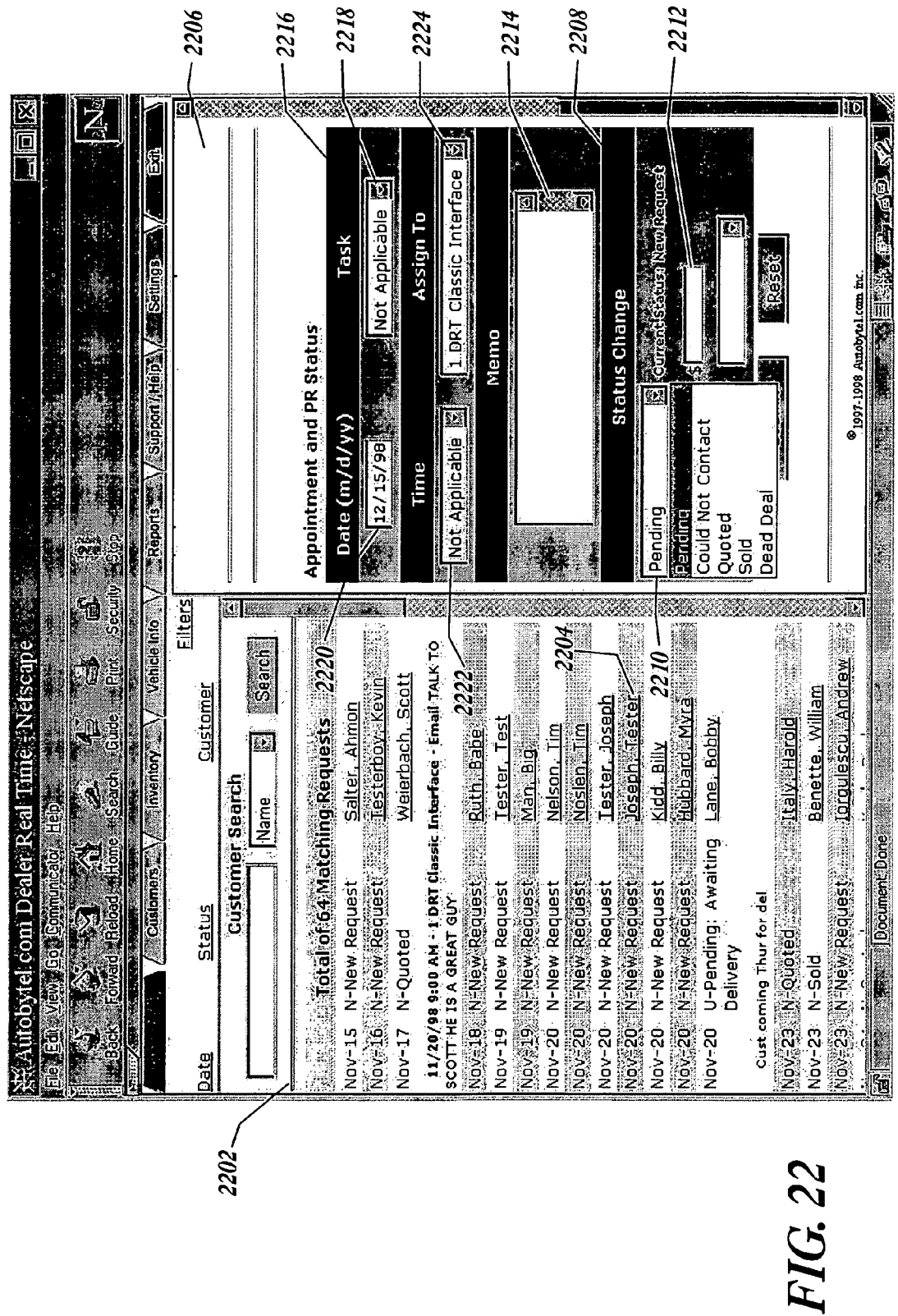
FIG. 22 is a representation of one embodiment of an HTML page illustrating a purchase request listing.
Figure 26:
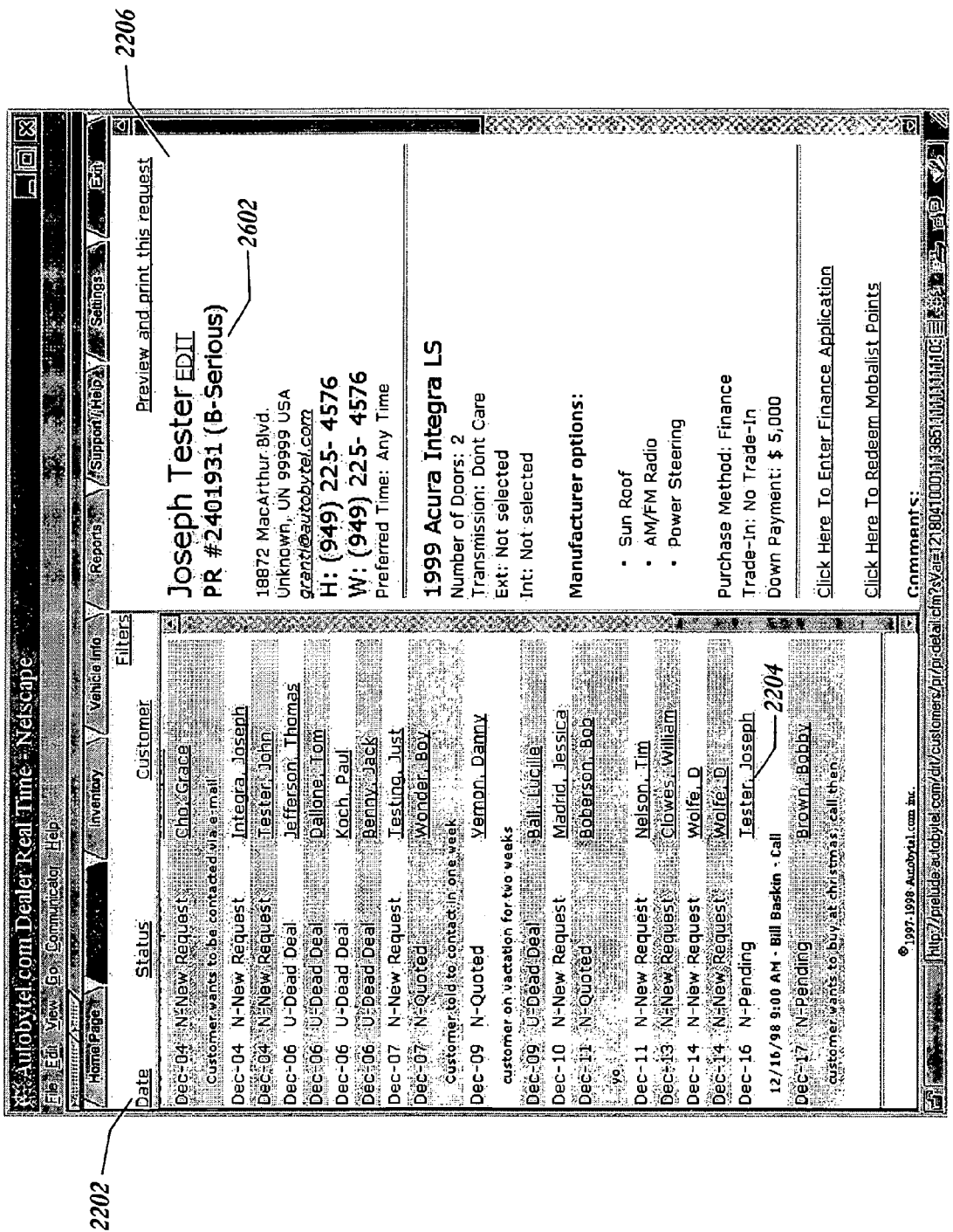
FIG. 26 is a representation of another embodiment of an HTML page illustrating a purchase request listing.

In one embodiment, a scrollable detail display 2206 appearing on the right side of the HTML page generally illustrated in FIG. 22 does not initially display the details of a purchase request. The right side of the HTML page initially displays a message substantially similar to the message displayed in FIG. 17. At a step 2104, the user utilizes a purchase request detail display module to display a purchase request's details. For example, the salesperson can select a purchase request from the purchase request listing 2202 by clicking on a customer name link 2204, "Joseph, Tester" in the example, using a pointing device such as a mouse, or the like. This causes the purchase request detail display module to display the contents of Tester Joseph's purchase request in the scrollable detail display 2206 in a step 2106. As can be seen in the figure, the location of the side bar in the scrollable detail display 2206 is shown scrolled to the bottom. The top of the scrollable detail display 2206 contains information substantially similar to that in the scrollable detail display 2206 illustrated in FIG. 26 except that in this example, the displayed name would be "Tester Joseph" instead of "Joseph Tester" as illustrated in FIG. 26.

Figure 23:
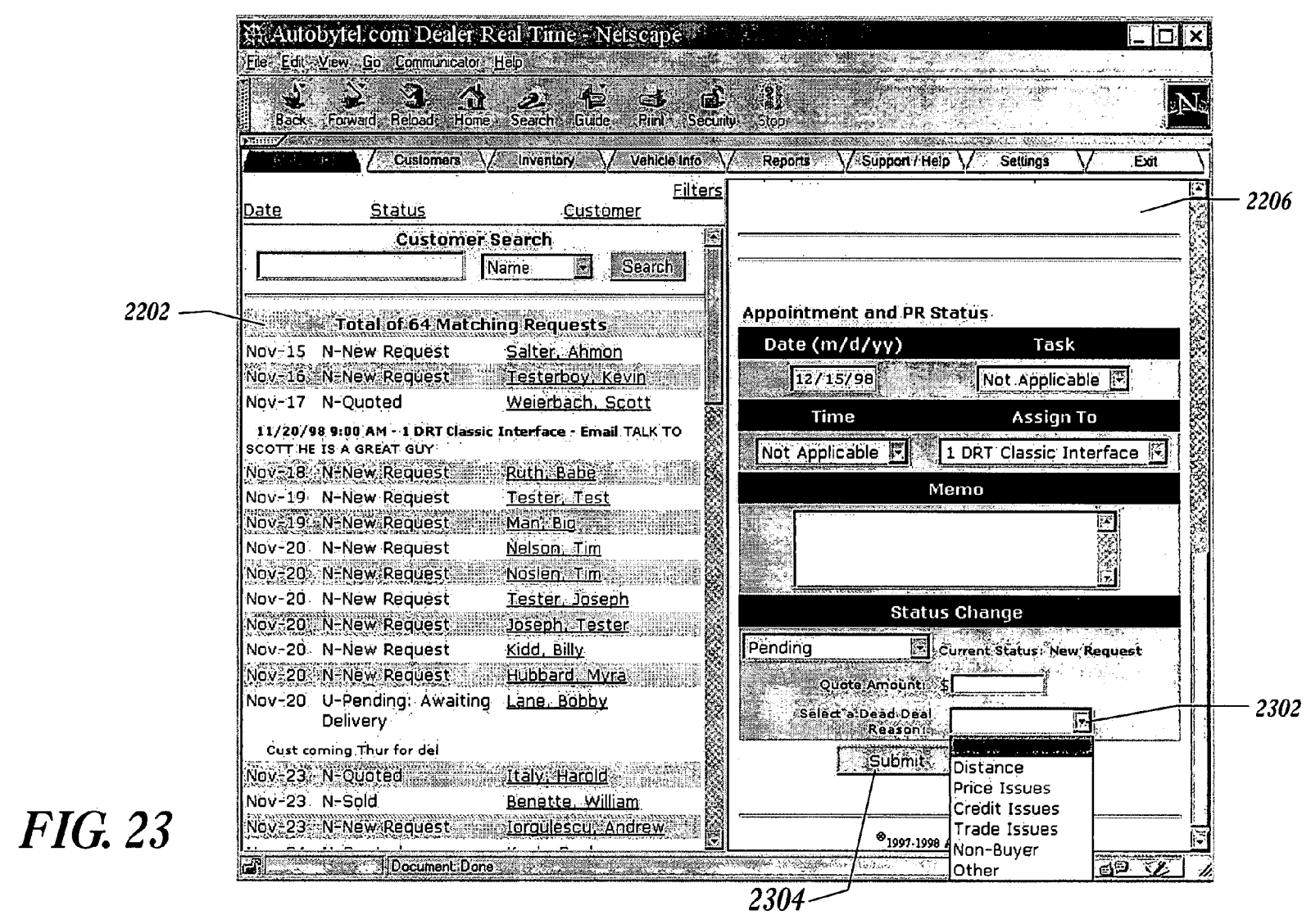

In a step 2108, the user may utilize a status change module to update the purchase request status. In one embodiment, the status change module comprises a status change screen 2208 within the scrollable detail display 2206 and facilitates the purchase request status update. The user may advantageously change the status to reflect certain buyer feedback obtained during a communication with the buyer. The communication may, for example, be a phone conversation, an e-mail message, or a face-to-face meeting. For example, the salesperson may have provided the buyer a quote of $10,000. The salesperson could then change the status of the purchase request from its current status to a new status to indicate "quoted." The new status may be selected from a status pull-down menu 2210. Selecting the "quoted" status from the status pull-down menu 2210 requires the user to provide an amount quoted in a quote amount field 2212. In the example, the salesperson would have entered "10000" in the quote amount field 2212. Also, selecting a "dead deal" status from the status pull-down menu 2210 requires the user to provide a reason for the dead deal by making a selection from a dead deal reason pull-down menu 2302 (FIG. 23). Fields requiring user input may be indicated, for example, by a flashing red light appearing beside the required field.

In one embodiment, the user may also specify a memo in a memo field 2214. For example, the salesperson may provide a memo indicating the reason for the price quote of $10,000. The contents of the memo may be maintained along with the purchase request status and may advantageously be displayed along with the status. The contents of the memo may be displayed using a different font or a different color to better identify the memo's contents. In another embodiment, the memo contents may be maintained in a separate record pointed to by either the status field 730 in the new vehicle purchase request record or the status field 826 in the used vehicle purchase request record.

Figure 24:
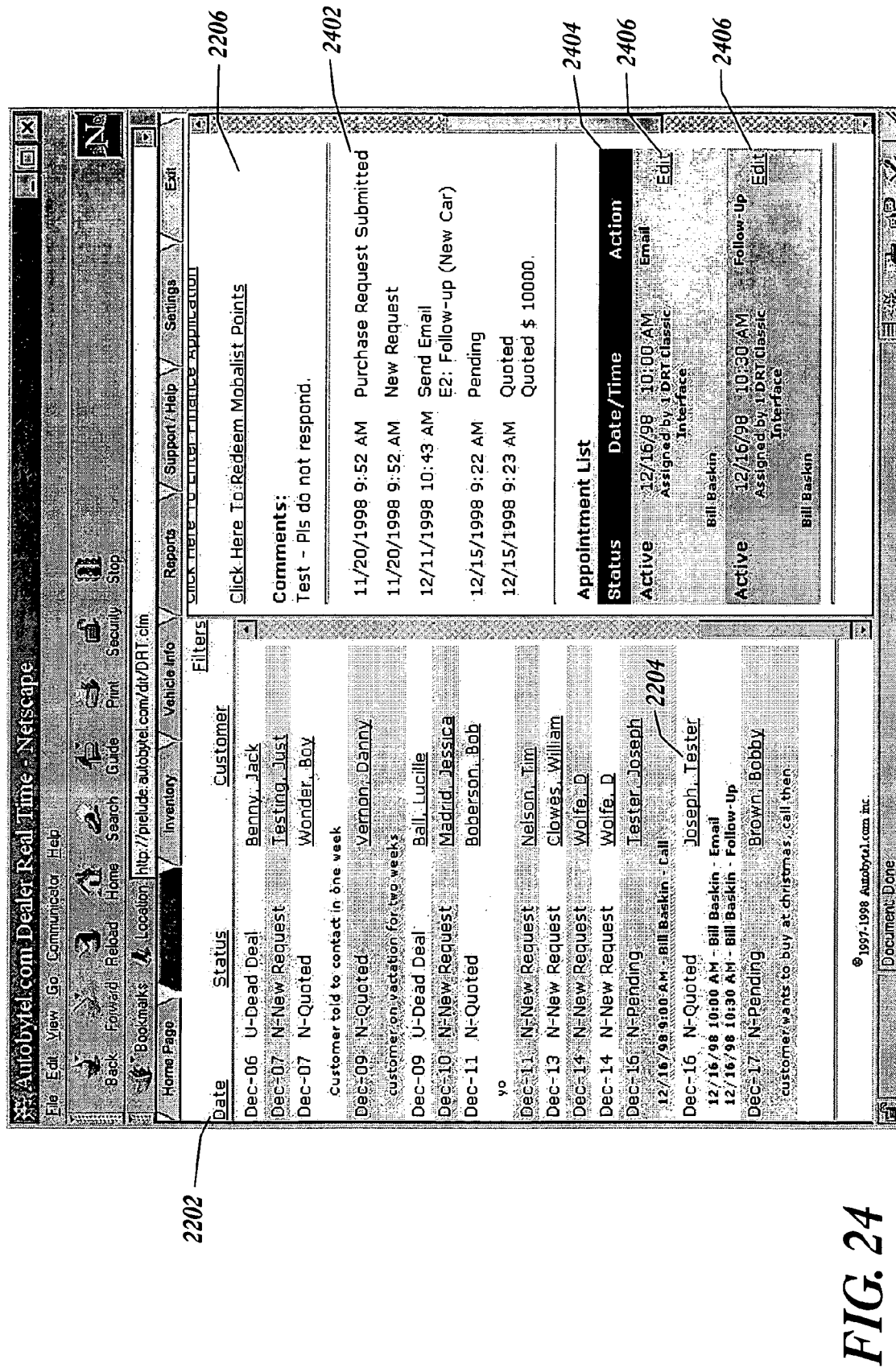
FIG. 24 is a representation of one embodiment of an HTML page illustrating an updated scrollable detail display and an updated purchase request list.

Having made the appropriate status selection, the user clicks on a submit button 2304 using a pointing device such as a mouse, or the like, to activate the status change. The status change module immediately access the appropriate records in the dealer's exclusive database region and makes the necessary changes. Subsequently, the status change module immediately updates both the scrollable detail display 2206 and the purchase request listing 2202. FIG. 24 generally illustrates an updated HTML page containing the updated scrollable detail display 2206 and the updated purchase request listing 2202. As can be seen in the figure, the location of the side bar in the scrollable detail display 2206 is shown scrolled to the middle. In one embodiment, a purchase request status list 2402 immediately displays the new purchase request status as part of a purchase request status history list.

In another embodiment, the status change module immediately updates all displays containing a modified purchase request to reflect a purchase request modification. In one example, salesperson A may update Tester Joseph's purchase request status from new to quoted. Salesperson A's scrollable detail display 2206 and purchase request listing 2202 is immediately updated to reflect the status change to purchase request X. If salesperson B is viewing a purchase request listing 2202 containing Tester Joseph's purchase request at substantially the same time as when salesperson A performs the status change to Tester Joseph's purchase request, then salesperson B's purchase request listing 2202 is immediately updated to reflect the status change to Tester Joseph's purchase request.

In an alternative embodiment, not all users may be able to change a purchase request's status. The user profile record may advantageously contain information indicating whether the user is permitted to change the purchase request's status. For example, a sales manager may advantageously be permitted to perform a purchase request status change while salespersons may not able to perform a purchase request status change. The sales manager's profile record will indicate the ability of the sales manager to change a purchase request's status. In contrast, the salesperson's profile record will indicate the inability of the salesperson to perform this function. Thus, if a salesperson tries to change a purchase request's status, an error message may advantageously appear.

Figure 25:
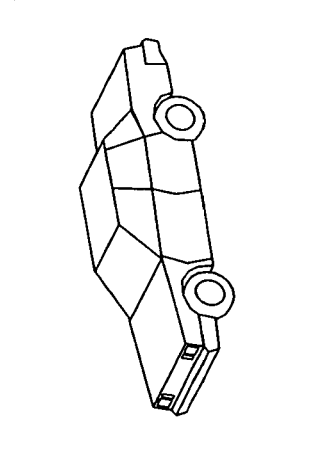
FIG. 25 is a representation of one embodiment of a buyer web page used to specify a purchase request priority.

In one embodiment, each purchase request has an associated purchase request priority. The buyer enters the purchase request priority through a web page utilized during the purchase request formulation and submission process. FIG. 25 generally illustrates such a buyer web page suitable for use in one embodiment of the invention. The buyer selects a purchase time period from a purchase time period list 2502. Depending on the type of vehicle requested, either new or used, the buyer's selection is input into either the priority field 728 in the new vehicle purchase request record or the priority field 822 in the used vehicle purchase request record.

In one embodiment, a purchase time period of 48 hours is associated with an "A-Immediate" priority, a purchase time period of 2 weeks is associated with a "B-Serious" priority, and a purchase time period of 30 days is associated with a "C-Future" priority. For example, a buyer, Joseph Tester, may select "2 weeks" from the purchase time period list 2502. The purchase request created will be assigned a priority of "B-Serious" by the Data Center system. A user belonging to the appropriate dealer group may then log into the Data Center system and access the purchase request listing 2202 generally illustrated in FIG. 26. The user may then use a pointing device such as a mouse, or the like, and click on the customer name link 2204 for Joseph Tester to display the details of Joseph Tester's purchase request in the scrollable detail display 2206. A purchase request priority display 2602 advantageously displays Joseph Tester's purchase request priority. In another embodiment, the time period specified in the purchase time period list may also be displayed in the purchase request priority display 2602. In an alternative embodiment, the user may sort the purchase request according to its priority, and may selectively display purchase requests depending on its priority.

Thus, the purchase request priority enables the user to better allocate resources in order to consummate a sale. The user may advantageously schedule daily tasks by focusing on the higher priority purchase requests. As an example, a salesperson may advantageously plan his or her daily activities by focusing more effort and attention to purchase requests with a higher priority. Moreover, the user may assign tasks to the appropriate sales staff based on the purchase request priority. For example, a sales manager may advantageously assign the higher priority purchase requests or the higher dollar value purchase requests to the more senior or more capable sales staff.

Figure 27:
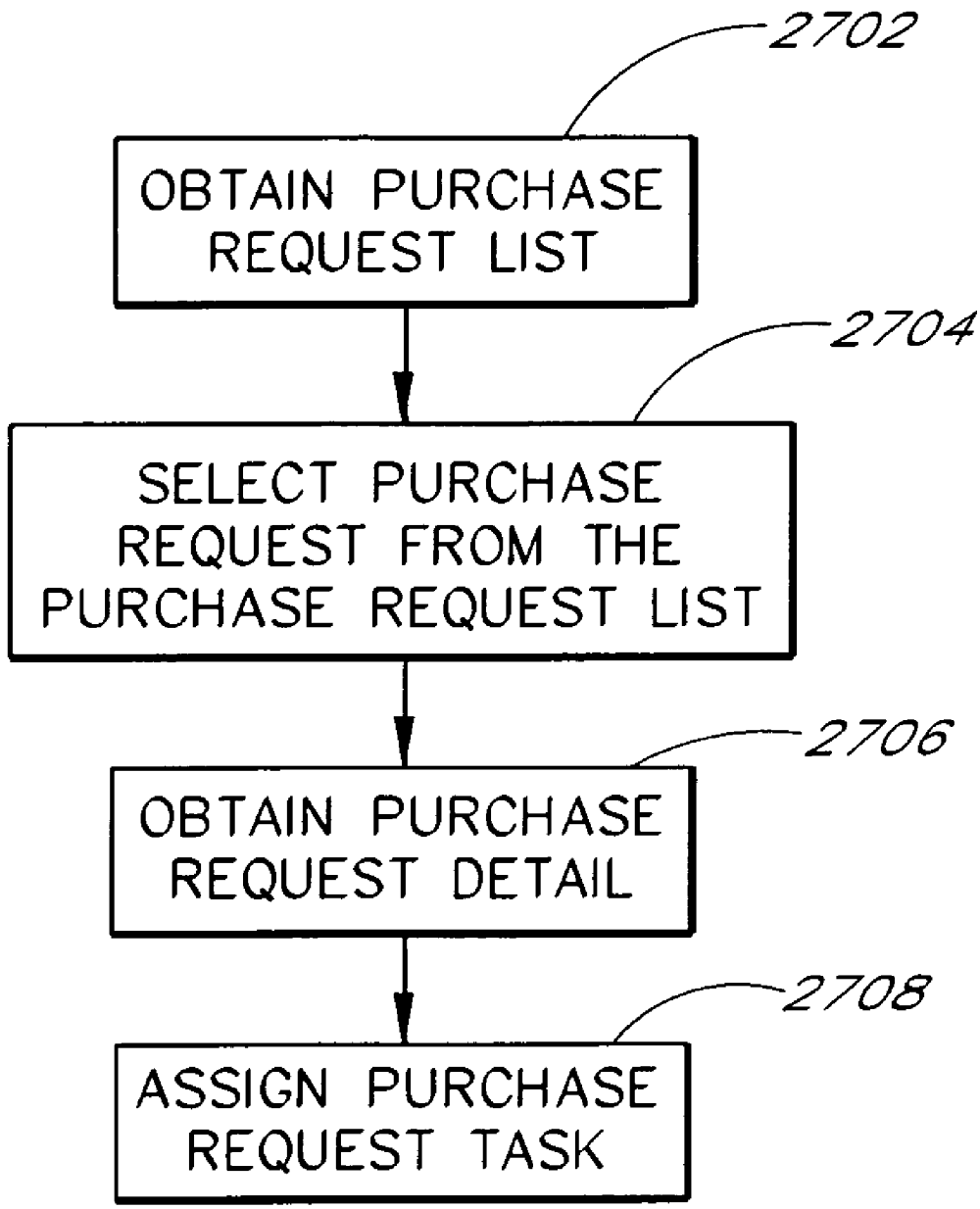
FIG. 27 is a flow chart illustrating a real time associating of a purchase request task in accordance with one embodiment of the present invention

FIG. 27 is a flow chart generally illustrating a real time associating of a purchase request task to a purchase request, and the assignment of the purchase request task to a user according to one embodiment of the invention. In particular, at a step 2702, the user obtains a listing of the purchase requests satisfying the user's filter conditions as specified in the user's profile record. For example, a sales manager, identified in the example as "1 DRT Classic Interface," may obtain a list of all new purchase requests. This is possible by specifying in the sales manager's profile record his or her desire to only list new purchase requests. The procedures previously discussed above in conjunction with the step 2102 may advantageously be used to obtain the purchase request listing 2202 (FIG. 22). At a step 2704, the user selects a purchase request from the purchase request listing 2202. The user clicks on the customer name link 2204 using a pointing device such as a mouse, or the like. This immediately causes the contents of the selected purchase request to be displayed in the scrollable detail display 2206 in a step 2706. As an example, the sales manager can select the customer name link 2204 for Tester Joseph to display the contents of Tester Joseph's purchase request in the scrollable detail display 2206.

In a step 2708, the user may utilize an associate task module to associate a task to the purchase request. In one embodiment, the associate task module comprises an assign task screen 2216 and facilitates the assigning of a specific task to a user in the dealer group. In assigning the task, the user may advantageously consider factors such as a user's schedule, user's capabilities, buyer's desires, purchase request status, and purchase request priority. As an example, the sales manager may determine that, of all the qualified salespersons, Bill Baskin is the most qualified to handle Tester Joseph's purchase request. The tasks may be comprised of, for example, not applicable, call, delivery, e-mail, follow-up, other, and test-drive.

In one embodiment, the user may select an appropriate task from a task pull-down menu 2218 to associate to the purchase request. The user selects a date the task is to be carried out in a task date field 2220. The user selects a time for the task to be carried out by making a selection in a task time pull-down menu 2222. The time pull-down menu may list the times in 15 minute increments. Finally, the user may assign a user to perform the task by making a selection from an assign to user pull-down menu 2224. The assign to user pull-down menu 2224 lists all users belonging to the same dealer group as the user. For example, the sales manager may assign Bill Baskin the task of sending Tester Joseph an e-mail message at 10:00 A.M. on Dec. 16, 1998.

Having provided the necessary information, the user clicks on a submit button 2304 (FIG. 23) using a pointing device such as a mouse, or the like, to activate the association and assignment of the specified task to the purchase request. The associate task module immediately access the appropriate records in the dealer's exclusive database region and makes the necessary changes. Subsequently, the associate task module may immediately update both the scrollable detail display 2206 and the purchase request listing 2202. The scrollable detail display 2206 comprises a purchase request task list 2404 which immediately displays the newly assigned task. The newly assigned task may initially be assigned an active status. For example, immediately upon the sales manager submitting the task, both the scrollable detail display 2206 and the purchase request listing 2202 will display the just created task assignment. As is illustrated in FIG. 24, the purchase request task list 2404 displays both the assignor of the task as well as the assignee.

In one embodiment, the specified task may be included in the assigned tasks field 2810 in the user record of the user assigned the task. The user may also specify a memo in the memo field 2214. The contents of the memo may be maintained along with the purchase request task and may advantageously be displayed along with the task. For example, the sales manager may state in the memo field 2214 his or her reason for assigning Bill Baskin the task. Further, the sales manager may be offered the capability of blocking others from viewing the contents of his or her memo field.

In one embodiment, the user may advantageously modify a purchase request task by utilizing a task edit link 2406. Clicking on the task edit link 2406 using a pointing device such as a mouse, or the like, activates a modify task module. The modify task module may display in the scrollable detail display 2206 a modify task screen. The user may advantageously use the modify task screen to make appropriate changes to the purchase request task. As an example, the sales manager may modify the date, the time, the task, and the assigned user. Also, the sales manager may advantageously modify the purchase request task status to, for example, active, inactive, or canceled.

In one embodiment, a user may advantageously view the tasks assigned to the user by clicking on the today's appointments total link 2006 (FIG. 20) using a pointing device such as a mouse, or the like. Subsequently, a list tasks module may display an HTML page which lists the user's appointments as well as the tasks assigned to the user. FIG. 29 generally illustrates such an HTML page suitable for use with one embodiment of the invention. For example, Bill Baskin may access the Data Center system and click on the today's appointments total link 2006 to view a list of his tasks. The assignment to send Tester Joseph an e-mail at 10:00 A.M. on Dec. 16, 1998, may advantageously appear in Bill Baskin's task list. (FIG. 29 illustrates an HTML page listing the appointments and the tasks for a different user.)

In another example, the sales manager may click on the customer name link 2204 for Tester Joseph using a pointing device such as a mouse, or the like. This immediately causes the contents of Tester Joseph's purchase request to be displayed in the scrollable detail display 2206. The sales manager may also assign Bill Baskin the task of following-up with Tester Joseph at 10:30 A.M. on Dec. 16, 1998. Once the sales manager submits the task to the associate task module, the assigned tasks immediately appear in the purchase request listing 2202 and the scrollable detail display 2206 (FIG. 24).

In another embodiment, all purchase request listings 2202 and scrollable detail displays 2206 containing Tester Joseph's purchase request is immediately updated to reflect the task assignment. For example, if Bill Baskin happened to be viewing a purchase request listing 2202 at substantially the same time as when the sales manager assigned the task, Bill Baskin's purchase request listing 2202 will immediately be updated to reflect the just created task assignment. In another embodiment, if Bill Baskin is viewing the HTML page listing his appointments at substantially the same time as the assignment of the task, the HTML page is immediately updated to reflect the task assignment.

In one embodiment, Bill Baskin may advantageously assign to himself tasks as a reminder to perform the assigned task. For example, Bill Baskin can assign to himself the task of calling a potential buyer on a specific day. Once the task is completed, Bill Baskin can edit the purchase request task status to inactive to, for example, signify the completion of the task. As another example, another salesperson may advantageously assign salesperson Bill Baskin the task of sending an e-mail message to a prospective buyer.

In an alternative embodiment, certain users may advantageously be qualified to assign tasks. The user profile record may advantageously contain information indicating whether the user is permitted to assign tasks. As an example, sales managers may be able to assign tasks to salespersons, but salespersons would not be able to assign tasks to other salespersons or sales managers. In yet an alternative embodiment, the assigned task may advantageously be a directive. For example, if a sales manager assigned a task to a salesperson, then the sales manager can modify the task assignment. In contrast, the salesperson will not be able to modify the task assignment.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A purchase request management system for multiple sellers to remotely manage purchase request records, the system comprising:
   a plurality of purchase request records stored in a computer system remotely accessible via a network and created from data received from potential buyers, said data including buyer contact information and product information;
   a plurality of participating seller records comprising information about a plurality of participating sellers, said purchase request records and seller records stored on computer-readable medium;
   a buyer-seller association software module stored on computer-readable medium and configured to assign each of said purchase request records to only a subset of the participating sellers in accordance with purchase request criteria, said purchase request criteria for each of said participating sellers predetermined in accordance with a relationship between a lead distributor and each of said plurality of participating sellers;
   a seller remote access software module executed on said computer system, stored on computer-readable medium, comprising computer-executable instructions that define operations for viewing and managing said purchase request records, and configured to provide each of said participating sellers with access to said computer system such that each seller can access only the subset of purchase request records which have been assigned to said seller by said buyer-seller association software module and can invoke the operations for viewing and managing said subset of purchase request records, wherein the operations for viewing and managing said purchase request records comprise:
      viewing status of purchase requests;
      modifying status of purchase requests;
      associating tasks with purchase requests; and
      assigning tasks associated with purchase requests to individual users associated with a seller;
   and
   a processor in communication with said buyer-seller association software modules and said seller remote access software module and configured to execute said buyer-seller association software modules and said seller remote access software module.

2. The purchase request management system of claim 1, wherein the seller access module receives seller-entered information about at least one of the purchase requests and stores the seller-entered information in a system database.

3. The purchase request management system of claim 1, wherein information about assigned tasks is stored in a system database.

4. The purchase request management system of claim 1, wherein information about purchase request status is stored in a system database.

5. The purchase request management system of claim 1, further comprising a system database comprising a plurality of product records, each product record corresponding to at least one product sold by at least one of the sellers and comprising at least a product type and an estimated product price.

6. The purchase request management system of claim 5, wherein the system database is configured to be accessible over a computer network to at least one potential buyer using a remote terminal and to provide product information to the potential buyer.

7. The purchase request management system of claim 1, further comprising a system database comprising a plurality of predefined sales regions and each purchase request corresponds to at least one of the predefined sales regions based on at least one geographic designation associated with the buyer contact information.

8. The purchase request management system of claim 7, wherein the buyer-seller association module is configured to assign each purchase request to only one seller.

9. The purchase request management system of claim 8, wherein the geographic designation associated with the purchase request is derived from contact information of the potential buyer to whom the purchase request corresponds.

10. The purchase request management system of claim 9, wherein the geographic designation associated with the purchase request is derived from the potential buyer's zip code.

11. The purchase request management system of claim 1, further comprising a system database comprising a plurality of exclusive database regions, each exclusive database region being reserved for a single seller and being configured to store only those purchase requests assigned to the single seller.

12. The purchase request management system of claim 11, wherein the buyer-seller association module is configured to assign each purchase request to one or more sellers by storing a copy of the purchase request in the exclusive database region of each assigned seller.

13. The purchase request management system of claim 12, wherein the seller access module provides access to each seller of only those purchase requests assigned to the seller by providing access to the seller of only the exclusive database region reserved for the seller.

14. The purchase request management system of claim 1, wherein said purchase request criteria for said plurality of participating sellers are collectively configured to ensure that the system assigns each of said purchase request records to only one of a plurality of subsets of the participating sellers that sell the product identified in the purchase request record.

15. The purchase request management system of claim 1, wherein the plurality of subsets of participating sellers for a given product includes at least one subset containing just one seller and each of the subsets of participating sellers for a given product is no more than a small number relative to the total number of participating sellers for a given product.

16. The purchase request management system of claim 1, wherein the buyer-seller association software module assigns each of said purchase request records to only a small subset of the participating sellers.

17. The purchase request management system of claim 1, wherein the buyer-seller association software module assigns each of said purchase request records to only a subset of the participating sellers, wherein the subset comprises between one and five of the participating sellers.

18. The purchase request management system of claim 1, wherein the buyer-seller association software module assigns each of said purchase request records to only a subset of the participating sellers, wherein the subset comprises between one and ten of the participating sellers.

* * * * *